United States Patent
Cortés Cortés

(10) Patent No.: US 12,291,761 B2
(45) Date of Patent: May 6, 2025

(54) SOLID-LIQUID-SOLID METHOD FOR THE SOLUBILISATION OF COPPER MINERALS AND CONCENTRATES, INDEPENDENT OF THE REDOX POTENTIAL AND WITH LOW CONSUMPTION OF WATER AND ACID

(71) Applicant: NOVA MINERALIS S.A., Santiago (CL)

(72) Inventor: Rodrigo Andrés Cortés Cortés, Región Metropolitana (CL)

(73) Assignee: NOVA MINERALIS S.A., Santiago (CL)

( * ) Notice: Subject to any disclaimer, the term of this patent is extended or adjusted under 35 U.S.C. 154(b) by 827 days.

(21) Appl. No.: 17/292,573

(22) PCT Filed: Nov. 14, 2018

(86) PCT No.: PCT/IB2018/058969
§ 371 (c)(1),
(2) Date: May 10, 2021

(87) PCT Pub. No.: WO2020/099912
PCT Pub. Date: May 22, 2020

(65) Prior Publication Data
US 2022/0042139 A1     Feb. 10, 2022

(51) Int. Cl.
C22B 15/00    (2006.01)
C22B 3/08     (2006.01)
C22B 3/10     (2006.01)

(52) U.S. Cl.
CPC ............ *C22B 15/0069* (2013.01); *C22B 3/08* (2013.01); *C22B 3/10* (2013.01); *C22B 15/0071* (2013.01)

(58) Field of Classification Search
CPC ......... C22B 15/0069; C22B 3/08; C22B 3/10; C22B 15/0071
See application file for complete search history.

(56) References Cited

U.S. PATENT DOCUMENTS 10,041,143 B2 * 8/2018 Rautenbach ........ C22B 15/0071
2017/0335428 A1 * 11/2017 Gutiérrez ................. C22B 3/44

* cited by examiner

*Primary Examiner* — Brian D Walck
*Assistant Examiner* — Nazmun Nahar Shams
(74) *Attorney, Agent, or Firm* — Morgan, Lewis & Bockius LLP

(57) ABSTRACT

The present invention relates to a chemical and physical hydrometallurgical method with solid-liquid-solid interaction for the solubilization of copper sulphides, by Selective Transformation and Precipitation of soluble, chlorinated, copper species, where said method does not depend on the redox potential and can be carried out in a wide range of pH under conditions of salts supersaturation, which is a condition that is generated by periods of non-irrigation, from ores or copper concentrates, mainly primary sulphides, such as chalcopyrite comprising said copper. This method is composed of 3 steps, called "Moistening and Solvation Step", "Selective Transformation and Precipitation Step" and "Acid-Chlorinated Washing step", wherein said method does neither require the addition of oxidizing or reducing agents, nor oxygen. Furthermore, the steps of the method can be applied only with the presence of water, where acid addition is not required. On the other hand, the repetitions of the steps of the method potentiate the physical effects on the ore or concentrate through the phenomena of haloclasty and crystallization of salts. The invention can also be applied to sulphide base metals such as nickel, zinc, cobalt, lead, molybdenum, among others, independently of the usual impurities of the sulphide ores, as occurs with the presence of arsenic.

21 Claims, 10 Drawing Sheets

SOLID-LIQUID-SOLID METHOD FOR THE SOLUBILISATION OF COPPER MINERALS AND CONCENTRATES, INDEPENDENT OF THE REDOX POTENTIAL AND WITH LOW CONSUMPTION OF WATER AND ACID

SCOPE OF THE INVENTION

The present invention relates to a chemical and physical hydrometallurgical method with solid-liquid-solid interaction for the solubilization of copper sulphides by Selective Transformation and Precipitation of soluble, chlorinated, copper species.

The developed method does not depend on the redox potential and can be carried out over a wide range of pH under conditions of salts supersaturation, a condition that is generated by periods of non-irrigation, from ores or copper concentrates, mainly primary sulphides, such as the chalcopyrite. This method is composed of 3 steps, called "Moistening and Solvation Step", "Selective Transformation and Precipitation Step" and "Acid-Chlorinated Washing Step"; it does not need the addition of oxidizing or reducing agents, nor of oxygen. In addition, the steps of the method can be applied only with the presence of water, wherein acid is not needed to be added. On the other hand, the repetitions of the steps of the method potentiate the physical effects on the ore, through the phenomena of haloclasty and crystallization of salts. The invention can also be applied to other sulphide base metals such as nickel, zinc, cobalt, lead, molybdenum, among others, independently of the usual impurities of sulphide ores, as occurs with the presence of arsenic.

BACKGROUND OF THE INVENTION

Ore resources and climate change are intimately related, not only because mining requires a large amount of energy and water, but also because the world cannot face the climate change without an adequate supply of raw materials to manufacture clean technologies (Alonso E. et al., 2012). The mining industry is one of the industrial areas with high energy consumption; that is the reason why there is great concern about the energy requirements and the environmental Impacts that can be generated. The future availability of metals and other ore products will depend on economic and market factors (prices of metals, supply and demand thereof), technological developments to improve extraction and on social and environmental pressures (Franks D. et al., 2014).

Copper is a widely used metal and is essential in several economic sectors, for example, in the generation of conventional and renewable electricity, electric vehicles, electrical and electronic equipment and Infrastructure. The demand for copper has increased rapidly in recent years, due to the increase in world population, economic growth and the transition of society towards sustainability (USGS, 2009). However, its production has a high energy consumption and therefore a great environmental impact, which will aggravate in the coming decades due to the projected increase of 275-350% of copper demand by 2050 (Elshkaki A. et al., 2016). Recent studies on the critical and short-term risk assessment of ore supply suggest that in the next two to three decades the copper industry will have a difficult time meeting world demand, and its substitutes will not be readily available (Elshkaki A et al., 2016; Meinert L. et al., 2016).

Chalcopyrite is the most abundant primary sulphide, and it represents about 70-80% of the world's copper reserves (Hall S. et al., 1973, Kaplun et al., 2011). This ore Is stable and is the copper sulphide most refractory to hydrometallurgical processes. Additionally, the formation of a passivating layer has been observed, when it is subjected to a variety of leaching agents, which complicate the dissolution thereof even more (Dreisinger, 2006; Veloso et al., 2016).

Enargite is also a primary sulphide of copper and is present in deposits in Peru and Chile mainly, being of environmental concern due to the arsenic content thereof, which requires special foundries. For this reason, most foundries penalize the arsenic content in concentrates. Together, arsenic is considered the most dangerous inorganic pollutant, since it causes environmental and health emergencies in several areas of the world (Mandal B. et al., 2002).

The hydrometallurgical processes that have been developed to leach ores and/or copper concentrates could be divided into: chlorinated processes, nitrates processes, sulfates processes, ammonia processes, iodides processes and bacterial processes, among others. However, regardless of the leaching agent used, it always takes place in aqueous medium with high concentrations of sulfuric acid and normally requires an oxidizing agent, such as ferric and/or cupric ion, in addition to the presence of oxygen (Dutrizac. 1991; Drelsinger, 2006; Senanayake, 2009; Kawashima et al., 2013; Waltling, 2014; Veloso et al., 2016). For the specific case of chalcopyritic concentrates and enargite, it can be added that most processes takes place at temperatures above 80° C. (McDonald et al., 2007, Gupta, 2010, Waltling, 2014).

The first use of chloride ions in metallurgy goes back to the sixteenth century in a process to amalgamate silver. The next important process was in 1860 when cuprous chloride was used for the direct decomposition of silver sulphide, which can be considered as the beginning of the use of chloride in hydrometallurgy (Liddell, 1945). Since then, numerous investigations of chlorinated leaching have been developed for the dissolution of sulphide ores and copper concentrates (Dutrizac, 1991). The developed processes were mainly based on the use of chloride with oxidizing agents, such as cupric chloride ($CuCl_2$) and ferric chloride ($FeCl_3$) due to the advantages related to the high solubility of copper and ferric ion, sulfur control, and economy of the process (Dutrizac and MacDonald, 1974, Dutrizac J., 1981, Dutrizac J., 1991, Havlik T. et al., 1995, Dreisinger, 2006, Carneiro, 2007, Nicol et al., 2016).

Water shortages in mining areas, such as northern Chile and southern Peru, have led mining operations to use seawater, either desalinating it or using it directly in the leaching process. The best water quality in ore dissolution processes is not necessarily completely desalinated, since the presence of some ions—such as the chloride ion, can be used to benefit the dissolution of the ore (Dixon, 2013; Cisternas et al., 2017). The use of seawater in copper mining in Chile has increased significantly since 2010 to 2015, and a sustained increase of this resource in copper mining is projected for the future (Cochllco, 2016). The leaching of copper sulphides with seawater is associated with the use of chloride in the oxidative solution of secondary sulphides, such as chalcocite and covellite. On the contrary, the use of chloride in the chalcopyrite solution has not been effective, due to slow kinetics and incomplete dissolution (Dreisinger, 2006; AI-Harahsheh et al., 2008; Nicol et al., 2016; Lundstrom M. et al., 2016).

Chile is the world's leading copper producer and according to the Chilean Copper Commission (Cochilco) in its 2016 report, it projects that there will be an important change in the structure of the final product of copper mining in Chile. This projection indicates that hydrometallurgical participation will go from 30.8% to 12% by 2027, and the production of concentrates will go from 69.2% to 89.9% by 2027. The decrease in hydrometallurgical participation in the type of ore extracted is due to the exhaustion of leachable resources, the appearance of refractory primary ores (chalcopyrite), and therefore the closure of mining operations. On the other hand, the appearance of primary sulphides leads to the processing of the high-grade ore mainly by flotation, which will address to a generation of idle capacity in the hydrometallurgical facilities, since no cost-effective hydrometallurgical technology for the treatment of primary sulphides of low-grade copper has been reported at industrial level (Cochilco, 2017). On the other hand, the increase in the production of concentrates will lead to an increase in the environmental liabilities (tailings) and the processing capacity of the smelters.

DESCRIPTION OF THE STATE OF THE ART

Hydrometallurgy is a science and technology for the extraction of metals or materials by aqueous methods (Habashi, 1993). In general, this discipline of extractive metallurgy is developed in three different and sequential physical-chemical steps, called selective dissolution or leaching, purification/concentration and precipitation (Domic, 2001). This well-established science has competed energetically with pyrometallurgical techniques, and in some cases has displaced such processes. In the last time with the depletion of high grade ores and with the presence of abundant primary low-grade ores, hydrometallurgy appears as a possible, economically viable option to treat low-grades primary ores (Habashi, 2005). The selective dissolution of a solid by means of an aqueous solution has been applied in copper ores in heaps, being a well-established and successful process for oxidized ores and copper secondary sulphides, such as chalcocite and covellite. On the contrary, for primary sulphide—such as chalcopyrite, it is still a problem of great relevance for copper mining, both for ores and concentrates (Dreisinger, 2006, Nicol et al., 2016, Liu et al., 2017).

The chemical leaching of ores is a heterogeneous phenomenon, where the reaction takes place at the interface between a solid and a liquid, involving solid-liquid and solid-liquid-gas phenomena (Habashi F., 1999; Dixon and Petersen, 2003). In general terms, it can be said that the dissolution of a ore in an aqueous medium is ruled by the diffusional steps (Wen C, 1968, Crest, A, 2000, Dixon and Petersen, 2003). On the other hand, heterogeneous reactions involving solid-gas and solid-solid phases at room temperature, without the intervention of a liquid phase, have an extremely slow reaction rate (Lefebvre R., 2001, Evans K., 2006).

Chalcopyrite ($CuFeS_2$), enargite ($Cu_3AsS_4$) and bornite ($CusFeS_4$) are refractory and semiconducting, sulphide and primary copper ores such as the vast majority of sulphide ores with a crystalline structure, wherein the iron and copper ions are in tetrahedral coordination with sulfur in the case of chalcopyrite (Hall S. et al., 1973, Nikiforov K., 1999). Spectroscopic measurements of chalcopyrite and bornite have identified that the electronic structure of both ores is the same for copper ($Cu^+$) and Iron ($Fe^{3+}$) with a molecular weight for the first one of 183.52 g/mol and for the second one of 501.8 g/mol, where each atom provides in its atomic weight the following percentages: Cu 34.6%; Fe 30.4%; S 34.9% and Cu 63.3%; Fe 11.1%; S 25.5%, respectively (Grguric B et al., 1998, Mikhlin et al., 2004, Pearce et al, 2006). Enargite is a copper sulphide with arsenic, like chalcopyrite and bornite has a +1 valence for copper; however, it has a molecular weight of 393.8 g/mol and each atom in its atomic weight is provided by the following percentages: Cu 48.4%; As 19.0%; S 32.6% (U D. et al., 1994, Arribas J. 1995, www.mindat.org).

The low kinetics of copper extraction from primary sulphides—by oxidative and/or reductive conditions in the presence of low and high concentrations of chloride has generated a large amount of research work, in order to mainly understand the oxidative dissolution of this ore, and these works are summarized in these publications (Debemardi and Carlesi, 2013, Kawashima et al., 2013). On the other hand, it is suggested that the use of chloride in the chalcopyrite solution has several challenges to face in order to be implemented in a heap leaching process. One of said challenges is to achieve the regeneration of oxidizing agents such as cupric Ion and ferric ion, and also to control pH, redox potential and passivation. The latter is suggested to be generated by the formation of different compounds, such as disulphide dichloride ($S_2Cl_2$), elemental sulfur, non-stoichiometric secondary sulphides and chlorocuprate I complexes, which are absorbed by the ore surface (Lu et al., 2000, Cameiro, 2007, Lundström et al., 2016, Nicol., 2017, Liu et al., 2017).

Copper ions can form complexes with chloride ions and the prevalence of the complex will depend on the chloride concentration and the leaching environment. In solutions with high chloride concentration there is a prevalence of cuprous complexes $[CuC_2]^-$, $[CuCl_3]^{-2}$, $[Cu_2Cl_4]^{-2}$, $[Cu_3Cl_6]^{-3}$, over the copper complexes $[CuCl]^+$, $[CuCl_2]^0$, $[CuCl_3]^-$, $[CuCl_4]^{2-}$, which as the concentration of chloride increases, its solubility decreases. On the contrary, the chlorocuprate (I) complexes increase their solubility as the chloride concentration increases (Berger and Winand, 1983, Fritz, 1980, 1981, Un et al., 1991, Winand., 1991; et al., 2010). The beneficial effect of chlorocuprate I complexes in the solution of chalcopyrite has not been extensively studied, and they are considered as dissolution inhibitors; therefore, it is sought to maximize the presence of copper ions as an oxidizing agent over chlorocuprate I complexes (Winand., 1991; Liu et al., 2017).

The use of chloride in the dissolution of chalcopyrite in an oxidative medium has been applied using saturated and unsaturated chloride solutions. On the one hand, it was observed that at low concentrations of chloride the passivation of the ore could be avoided, due to the low REDOX potentials achieved under these conditions (Veldsquez et al., 2010). On the contrary, the use of concentrated chloride solutions has been suggested to be effective in the curing and pre-treatment of the ore, which is then subjected to an oxidation process at low or high REDOX potential (Patiño et al., 2014). Recent studies derived from the results of Patiño show that the solubilization of a chalcopyritic concentrate with concentrated solutions of chloride in an oxidizing medium only achieved a copper extraction of 19% (Lundstrom M. et al., 2016). In addition, it is suggested that chalcopyrite is oxidized to covellite, which is different from the suggestion of Pihlaso et al. (2008) who mentioned the formation of chalcosine. The use of high concentrations of a reagent can generate an increase in the reaction rate; however, it could also generate unwanted side reactions, and be economically non-viable (Habashi F., 1999). On the other hand, some works propose that chalcopyrite could be reduced by cuprous ions in an aqueous medium with acetonitrile and/or chloride at high temperatures, reducing chalcopyrite to chalcosine or bornite (Avraamides et al., 1980, Winand, 1991). Furthermore, according to thermodynamic studies, it is suggested that chlorocuprate I complexes in a chlorinated medium increase the critical potential, which would generate an Increase in the extraction of copper from the chalcopyrite, following the model suggested by Hiroyoshi (Yoo et al., 2010). However, there is a limited amount of thermodynamic studies in concentrated chloride solutions, which makes this an unexplored field (Fritz, 1980, 1981, Winand, 1991).

During the process of mechanical preparation of the ore the generation of fine particles takes place, which can affect the permeability of the heap. Agglomeration is a process that is generally used before leaching into oxide heaps and secondary sulphides, and it consists of joining the fine particles to the coarser ones, in order to increase the permeability coefficient in the heap and thus be able to have conditions of irrigation and efficient aeration to improve the extraction process (Bouffard S C, 2005, 2008). Consequently, the process of agglomeration is of vital importance to maintain a good hydrodynamic of the heap and to avoid the formation of a pool therefrom. The simplest agglomeration process is through the addition of water and acid, in order to moisten the ore until an optimal surface tension is achieved. Therefore, the presence of water in the agglomeration process is of vital importance, since without the presence of water there are no agglomerates and neither an adequate distribution of the acid, which would cause an inefficient curing (Domic E., 2001; J et al., 2017). On the other hand, during this step the process of curing the ore is also carried out by the addition of concentrated sulfuric acid, so that it acts on all the ore particles and generates the best conditions for the leaching process. The acidity both in the curing step and in the leaching solutions is very important, since it interacts with the ore and with the gangue, so that the lack of acid could harm the extraction of the copper (Bouffard S C, 2005; J et al., 2017). The process and equipment of agglomeration and curing can be conducted by adding water and then acid on the ore on a conveyor belt or by using an agglomerating drum that allows a moisten particle to rotate around Itself, allowing efficient formation of the agglomerate (Domic E., 2001).

Salt erosion affects porous materials, such as rocky outcrops and ores. The chemical species (anions and cations) are transported by aqueous solutions, which can be introduced into the ores by their pores and/or diadasis. The concentration of the salts in solution will vary during the circulation through the ore or the rock, which can be generated due to the following conditions: chemical interaction with the ore, water evaporation, temperature variations and relative moisture variations. The increase of the concentration of a salt by water evaporation and under given environmental conditions will generate the precipitation thereof that will take place when the concentration of the salt is such that the product of solubility is equal to or greater than the equilibrium constant. When the product of solubility is equal to the equilibrium constant, the condition is balanced and the solution is called saturated, whereas when the product of solubility is greater than the equilibrium constant, the condition is unbalanced and the solution is called supersaturated (Grossi C M et al., 1994; Desarnaud J. et al., 2016).

Sodium chloride is a soluble salt with a high tendency to supersaturation and it is very mobile in solution and can penetrate deeply into fractures or diaclasis of ores or rocks. The solubility of this salt is 36 grams in 100 grams of water at 20° C., concentration at which a saturated solution is achieved. Its aggressive action and deterioration in the rock is mainly due to cryptoefflliorescence and haloclasty, due to its high solubility, hygroscopicity and its tendency to supersaturation. The location of soluble salts such as sodium chloride with respect to the outer surface of a ore depends on the mechanism of saturation or supersaturation of the solution. In case this is generated by an evaporation process, it will be controlled by two processes that act simultaneously: on the one hand, the rate of evaporation, and on the other, the rate of solution deposition through the ore. If the vapor diffusion rate is less than the rate of solution migration, the latter can reach the external surface, where the salts will evaporate and crystallize; this depends on the form of heat transfer, either by convection or radiation (Gômez-Heras et al., 2016). This last phenomenon is called efflorescence. If, on the contrary, the solution migration rate is lower than the water vapor diffusion rate, the equilibrium will be achieved at a certain distance from the surface, producing cryptoefflorescence. When the water vapor diffusion rates are higher, they will generate a greater precipitation of salts, which will enhance said phenomenon. The crystallization inside the fractured ore due to the evaporation of aqueous dissolutions will produce the growth of chloride crystals, which will generate pressures and loss of cohesion of the ore (Winkler, 1973, Amoroso et al., 1983, Lewin, 1989, Desarnaud J. et al., 2016). The variations of temperature and relative humidity of the air in contact with the precipitated salts induce processes of dilution and precipitation of salts. However, these processes are accompanied by phenomena of hydration and dehydration, which lead to phase transitions, generating an increase in the size of the crystals of soluble salts, and therefore the fragmentation of the rock, i.e., a phenomenon called haloclasty (Gupta et al., 2014; Desamaud J. et al., 2016).

The REDOX potential is an important parameter in the dissolution of the chalcopyrite, since it has been suggested that the formation of leaching products depends on the potential of the medium, Where a lower potential favors a higher extraction of copper. While a greater potential is obtained less copper extraction. (Elsherief, 2002; Hiroyoshi et al., 2001; Velásquez-Yévenes et al., 2010). However, the potential window at which these higher copper extractions are achieved is limited and difficult to control, which means that once the critical leaching potential is exceeded, the extraction of the chalcopyrite stops completely due to the leaching products, which block the surface of the ore, avoiding the extraction thereof (Dixon & Petersen, 2006, U et al., 2010, Ahmadi et al., 2010, Kaplun et al., 2011, Nicol, 2017; Liu et al., 2017).

The studies of the phenomena and mechanisms of the chalcopyrite dissolution have been directed to the kinds of leaching agents, dissolution parameters and to the passivation phenomenon. On the contrary, the role of the aqueous medium on the surface of the ore has not been extensively studied, considering that acid and water are the most abundant chemical species in hydrometallurgical processes. On the other hand, Oliveira C. et al. (2010) and Ferreira de Lima et al (2011) studied the adsorption of water on the surface of chalcopyrite at a molecular level, and found the formation of sulfur dimers and hydrophobic zones. These findings are suggested by the authors as a possible response to the low kinetics of dissolution of chalcopyrite in aqueous media.

The publication US20040060395 (Hamalainen, 2004) discloses a solid-liquid-gas oxidative process and is related to a process that uses a chlorinated environment for the leaching of concentrates by the action of cupric chloride in the presence of oxygen at elevated temperatures.

The publication U.S. Pat. No. 7,491,372 (Faine, 2005) reveals a solid-liquid-gas oxidative process, and is related to a process using calcium chloride, in order to improve the quality of the agglomerates and thus the permeability of a heap. In addition, the phenomenology of the process is based on favoring the generation of oxidizing agents ($Fe^{2+}$ and $Cu^{2+}$) by the action of oxygen and the redox duo of copper and iron, which causes the solubilization of sulphide ores.

The publication WO2007134343 (Müller et al, 2007) refers to a hydrometallurgical method composed of two steps: the first one related to a non-oxidative step in an acid medium, and a second one corresponding to an oxidative step involving solid-liquid-gas interaction. This is intended for the recovery of copper from primary and secondary ores, which comprises leaching the material in an acid solution with chloride at redox potentials inferior to 600 mV in the presence of dissolved oxygen and cupric Ions as oxidizing agents.

The publication WO2016026062 (Patiño et al., 2016) discloses a solid-liquid oxidative process that involves the addition of oxidizing agent and a pretreatment of the ore in the presence of high concentrations of chloride and minimum presence of oxygen, with redox potential superior to 700 mV for the solubilization of copper primary and secondary sulphides.

The publication WO2016026062 (Álvarez, 2016) discloses a chemical and bacterial process in a solid-liquid-gas medium, and is related to a process of leaching secondary and primary copper sulphides in a chloride-ferric-ferrous medium, with iron-oxidizing bacteria and archaea adapted to high concentrations of chloride ions. In addition, it involves the injection of hot air to raise the temperature and enhance the ore dissolution reactions.

The publication WO2016179718 (Engdahl et al, 2017) refers to a solid-liquid-gas oxidative method, in a three-phase mixing agglomeration drum, and to a ore agglomeration process carried out Inside said drum for the pretreatment of ores in the presence of sodium chloride, both used in hydrometallurgy mainly. Said drum and method employ a system and a recirculation step of chlorine gas as part of the invention.

The U.S. Pat. No. 7,749,302 (Hyvärinen et al., 2006) refers to the HydroCopper™ technology, developed by Outokumpu, which consists of an oxidative method in a solid-liquid-gas medium for the leaching of copper concentrates in high concentrations of copper chloride and sodium chloride, with the help of oxygen and temperature between 85-95° C.

The dissolution of chalcopyrite has been extensively studied, both by chemical and biotechnological processes during the last 60 years (Watiing H R, 2013, Li. Y. et al., 2013, Liu et al., 2017), wherein a lot of pathways and dissolution mechanisms in the presence of different salts and oxidizing agents have been suggested, but they always depend on the redox potential and pH.

The present invention differs from the state of the art in the fact that the solubilization of the primary and/or secondary sulphide concentrate or ore, mainly chalcopyrite, takes place through a chemical and physical process in the presence of chlorocuprate I complexes under solid-liquid-solid conditions that does not depend on the redox potential, and it is conducted in a wide range of pH, only with the presence of sodium chloride under supersaturation condition, which is achieved by periods of no irrigation and evaporation, thus generating physical phenomena on the ore (haloclasty). The method takes place at room temperature, with minimum consumption of water and acid, and there is no need to add oxidizing or reducing agents and oxygen, either by air injection or by constant irrigation. All this process takes place independent of the presence of common impurities such as arsenic. On one hand, from the environmental point of view, the method has the hydrometallurgy benefits along with reducing the consumption of acid and water, since the transformation can be done only with the presence of water or with the minimum addition of acid. On the other hand, the present invention would make resources available to reserves, which would supply the future copper demand, would re-activate the hydrometallurgical plants and change the projections of the final copper product in the next decade, thus decreasing the use of the flotation, which generates a great environmental impact, due to the high consumption of energy and water further to the generation of environmental and polluting liabilities due to the operation of the foundries.

SUMMARY OF THE INVENTION

The present invention relates to a chemical and physical hydrometallurgical method of Selective Transformation and haloclasty of copper sulphide ores to soluble chlorinated copper species, in the presence of chlorocuprate I complexes, conducted in a wide pH range and that does not depend on the redox potential, by means of a solid-liquid-solid reaction with the addition of sodium chloride as the sole reagent in an environment of supersaturation, which is achieved by water evaporation given by periods of no irrigation at room temperature, in order to solubilize copper from a primary sulphide ore, particularly chalcopyrite. This process is composed of 3 steps, called "Moistening and Solvation Step", "Selective Transformation and Precipitation Step" and "Acid-Chlorinated Washing Step". These steps can be repeated as many times as necessary to achieve maximum solubilization of the primary and/or secondary copper sulphide, either in the ore or concentrate.

These three overlapped or sequential steps are ruled by solid-liquid-solid chemical and physical phenomena that do not depend on the redox potential and they are conducted in a wide range of pH. For this purpose, sodium chloride is used in a humid environment, resulting in the solubilization of the copper sulphide of primary and/or secondary origin.

The first step, called Moistening and Solvation, corresponds to a step of moistening the ore in the presence of water or water and acid, in a non-oxidative, non-agglomeration-reducing process, but always in the presence of sodium chloride. The addition of water in this step causes the chloride ions to dissociate from the sodium ions and the solvation process takes place, which allows the chloride ions to be active to react with the ore. All these conditions cause variable pH conditions, redox potentials and minimal presence of oxygen, generating optimum conditions for the second step of the process.

The second step, called the Selective Transformation and Precipitation Step, corresponds to a chemical and physical process conducted in a wide range of pH, which does not depend on the redox and acid potential, carried out in a wet bed and in the presence of chloride under a supersaturation condition reached by evaporation. The moisture at which this step is carried out will depend on the hygroscopicity of the ore and sodium chloride. On the other hand, the dissolution of primary and/or secondary copper sulphide, mainly chalcopyrite, is given by the physical phenomenon of haloclasty and the Selective Transformation of the ore to soluble, chlorinated, copper species and the precipitation of these species in the presence of chlorocuprate complexes I, which are produced by the condition of oversaturation and almost zero presence of oxygen, a condition that is generated and enhanced during this step due to the long periods of non-irrigation. This Selective Transformation and Precipitation Step is carried out at room temperature, with or without adding acid, without the incorporation of oxygen, or the addition of oxidizing agents, and concludes with the begin of the Acid-Chlorinated Washing of the ore or concentrate.

The third step, called the Acid-Chlorinated Washing Step, corresponds to a washing step, wherein an acidulated solution or an acidulated unsaturated solution of sodium chloride is added to remove the soluble copper species generated in the second step; furthermore, the chloride and moisture concentrations in the ore are restored. Once the washing is finished, a new Selective Transformation and Precipitation Step begins, wherein the ore is not irrigated for periods of varying times.

The Acid-Chlorinated Washing can be addressed to generate a higher concentration of copper species in its reduced state ($Cu^{1+}$) by short periods of irrigation, and a solution with high concentration of chloride, or by promoting the increase in the concentration of copper species in its oxidized state ($Cu^{2+}$) through longer irrigation times and low chloride concentrations, in order to promote aeration of the system that allows cuprous Ions to be oxidized to cupric ions, and thus make the solution (PLS) compatible with the extraction process by solvent, wherein the extractants are designed to capture the cupric Ions and not the reduced copper species. On the contrary, the development of extractants for cuprous Ions would allow the direct PLS solution to be used in the solvent extraction process. In addition, the presence of copper +1 in a starting solution of the solvent extraction process (rich electrolyte or advance) would allow reducing the energy consumption in the electro-winning process, since copper +1 would be more energy efficient to reduce it to zero copper.

The reactions and mechanisms involved in the steps of the method can be carried out in any sulphide ore containing copper, iron, sulfur and arsenic, even in smaller amounts, being obvious that they will develop their effect on the dissolution of any other base metal, such as metallic sulphide. This applies to ores containing nickel, zinc, cobalt, molybdenum, etc.

DETAILED DESCRIPTION OF THE INVENTION

Figure 1:
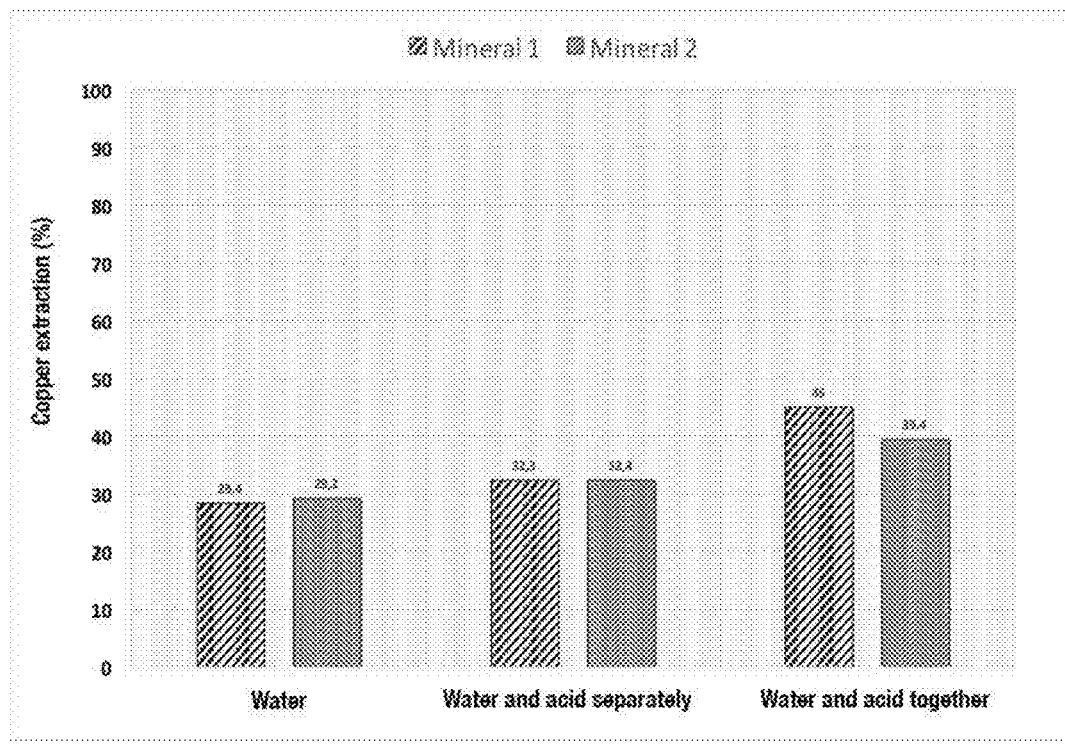
FIG. 1 shows a copper-extraction chart in relation to the form of addition of water and acid in the Moistening and Solvation Step using the ores No. 1 and No. 2.

The present invention relates to a chemical and physical hydrometallurgical method of Selective Transformation and haloclasty of copper sulphide ores to soluble, chlorinated, copper species, in the presence of chlorocuprate I complexes, conducted in a wide pH range and that does not depend on the redox potential, by means of a solid-liquid-solid condition in the presence of sodium chloride in supersaturation, which is achieved by water evaporation to solubilize copper from a ore or concentrate of primary origin, particularly chalcopyrite. This process is composed of 3 steps, called "Moistening and Solvation Step", "Selective Transformation and Precipitation Step", and "Acid-Chlorinated Washing Step". These steps can be repeated as many times as necessary to achieve maximum solubilization of copper sulphide, whether it is as ore or concentrate form.

These three sequential and/or overlapped steps are ruled by chemical phenomena in a solid-liquid-solid medium, different from each other. For this purpose, sodium chloride is used under a supersaturation condition, a medium that is generated by long periods of non-irrigation and evaporation, resulting in a physical effect on the ore and the solubilization of copper sulphide of primary and/or secondary origin.

Process for ore Solubilization

The process for copper ores includes the following steps, which are detailed below:

I. Moistening and Solvation Step

This step begins with the exposure of the crushed ore to a process of agglomerate, or agglomerate and curing in an agglomerating drum or on a conveyor belt, in order to wet, form agglomerates and dissolve sodium chloride, using conventional methods and process, with three exceptions. The first exception is that the addition of water and acid is conducted together. On the contrary, in a classical process of agglomeration and curing, acid and water are added separately. The second exception is that sodium chloride can be added as a solid, depending on the characteristics of the ore and the concentration of sodium chloride required for the dissolution of the ore, which range between 20 and 80 kg/t. The third exception relates to the fact that this step can be carried out only with the addition of water or with water and acid; in case of using only water no curing would take place. In relation to the use of circulating or recirculating solutions for the agglomerate process, acid and/or only sodium chloride are added in varying concentrations according to the content of the chemical species in the process recirculation solution. The concentration of sodium chloride used ranges from 20 to 60 kg/t. The addition of fresh and/or circulating sulfuric acid ranges from 0 to 30 kg/t of ore with a final moisture of the agglomerated ore that varies between 8 and 15%, depending on the characteristics of the ore, hygroscopicity and granulometry of the ore.

In this step only sodium chloride, water, or acid and water are required. The addition of oxidizing agents such as cupric ions is neither required, nor the addition of oxygen by constant irrigation or air injection.

Once the ore is agglomerated and/or cured, it is transported to the stacking fields and after the ore is part of the heap the Moistening and Solvation step finishes and the second Selective Transformation and Precipitation Step begins.

Conditions of Moistening and Solvation Step:
   a) Concentrations of sodium chloride between 20 and 80 kg/t.
   b) Target moisture between 8 and 15%.
   c) Acid concentration between 0 and 30 kg/t.

II. Selective Transformation and Precipitation Step

This second step takes place under solid-liquid-solid condition and consists in allowing the agglomerated ore or agglomerated and cured ore to rest or to keep it non-irrigated for variable periods of time, in order to generate the conditions of chloride supersaturation by evaporation, which promotes the phenomena of halocasty and Selective Transformation of primary sulphide in the presence of chlorocuprate I complexes and subsequent precipitation of soluble, chlorinated, copper species. The greater the rest period, the higher the supersaturation, precipitation, crystallization and haloclasty conditions due to the evaporation that generates an increase in the ionic charge and adsorption of chloride Ions on the surface of the primary ore present, mainly chalcopyrite. On the other hand, the repeated application of method cycles encourages hydration and dehydration, enhancing and favoring the physical effect on the ore.

In this step only sodium chloride, water, or acid and water are required. The addition of oxidizing agents such as cupric Ions is neither required, nor the addition of oxygen by constant irrigation or air Injection.

This Selective Transformation and Precipitation Step finishes when the continuous or intermittent irrigation of variable duration begins, using an acid and unsaturated solution of sodium chloride.

Selective Transformation and Precipitation Conditions:
   a) Concentrations of sodium chloride between 20 and 80 kg/t.
   b) Non-irrigation or resting time is from 20 to 90 days or more, depending on the reactivity of the surface of the ore or concentrate.
   c) Moisture between 6 and 10%.
   d) Temperature between 25 to 30° C.

III. Acid-Chlorinated Washing Step

Once the period of resting or no irrigation finishes, the third step of Acid-Chlorinated Washing begins, by means of irrigation with an acid solution of unsaturated sodium chloride.

The objective of the irrigation is to wash the ore bed to remove the copper and the soluble species generated during the second Selective Transformation and Precipitation Step. In addition, with this wash, whether continuous or intermittent, the moisture and chloride concentration of the ore bed is reinstated, in order to begin with the Selective Transformation and Precipitation step again, and thus achieving the maximum copper extraction from the primary or secondary copper sulphide.

Acid-Chlorinated Washing conditions:
   a) Concentrations of sodium chloride between 120 and 200 g/L.
   b) Net irrigation rate between 5-10 $L/h/m^2$.
   c) pH of the solution: 0.5 to 6.

The three steps: Moistening and Solvation, Selective Transformation and Precipitation and Acid-Chlorinated Washing can be repeated as many times as necessary, as long as it is possible to promote moistening and chloride concentrations again, in order to reach the maximum solubilization of the copper contained in the primary or secondary ore.

Process Flor Solubilization of Concentrates

The process for concentrates comprises the following steps, which are detailed below:

I. Moistening and Solvation Step

This step begins with the mixture of the concentrate with sodium chloride; thereafter, water, or water and acid are added, in order to achieve optimum moistening of the concentrate and solvation. The concentration of sodium chloride used ranges from 20 to 80 kg/t in a solid-liquid-solid or saturation condition, in relation to the volume in a solid-liquid medium. However, the concentration of fresh and/or circulating sulfuric acid will be necessary to achieve a pH between 0.5 and 3. The final moisture varies between 8 to 20%, depending on the characteristics of hygroscopicity of the salt and concentrate.

In this step only sodium chloride, water, or acid and water are required to moisten the concentrate. The presence of oxidizing agents, temperature and the injection of oxygen are not required.

Once the concentrate is mixed with salts and optimum moisture has been imposed, which corresponds to the maximum moisture that the concentrate can stand before forming a paste, it is transported to concentrate accumulation fields to begin with the Second Selective Transformation and Precipitation Step. On the other hand, it is also possible that the Moistening and Solvation step be in a flooded medium, that is, in a reactor, placing the concentrate in a liquid medium in concentrations of saturation or non-saturation of sodium chloride.

Moistening and Solvation Conditions (Solid-Liquid-Solid):
   a) Concentrations of sodium chloride between 20 and 80 kg/t.
   b) Moisture between 9 and 20%.
   c) pH between 0.5 and 7.
   d) 100% particle size inferior to 150 microns.

Moistening and Solvation Conditions in Flooded Medium (Solid-Liquid):
   a) Concentration of sodium chloride between 100 and 340 g/L.
   b) pH between 0.5 and 5.
   c) Particle size, 100% inferior to 150 microns.

II. Selective Transformation and Precipitation Step

This second Selective Transformation and Precipitation Step consists in allowing the wetted concentrate to rest for variable periods of time, in order to generate the condition of chloride supersaturation and Selective Transformation of the concentrate to soluble, chlorinated, copper species and precipitation of the soluble species. On the other hand, as the resting period increases, the moisture decreases and the supersaturation condition is enhanced, due to the water evaporation. In addition, the prolonged period of non-irrigation promotes the crystallization of salts and the phenomenon of cryptoefflorescence in the particles of the concentrate.

In this step only sodium chloride, water, or acid and water are required. The addition of oxidizing agents such as cupric ions is neither required, nor the addition of oxygen by constant irrigation or air injection.

This Selective Transformation and Precipitation Step finishes when the Acid-Chlorinated Washing of variable duration begins, using an acid and/or unsaturated solution of sodium chloride.

Selective Transformation and Precipitation Conditions (Solid-liquid-solid):
  a) Sodium chloride in supersaturation.
  b) Time of no irrigation or resting of 20 to 90 days or more, depending on the reactivity of the surface of the concentrate.
  c) Moisture between 8 and 15%.
  d) Room temperature.
  e) Acid pH.

The application of the Selective Transformation and Precipitation Step in a flooded medium (solid-liquid) consists of stirring the solution having high concentrations of sodium chloride with the concentrate, in an acidic medium for a period ranging from 25 to 90 days at room temperature.

Conditions of Selective Transformation and Precipitation in flooded, solid-liquid medium:
  a) Concentration of sodium chloride at saturation or close to saturation in relation to the volume used.
  b) Room temperature.
  c) Agitation time between 25 to 90 days.
  d) pH between 0.5 and 6.9.

III. Acid-Chlorinated Washing Step

The concentrate that was subjected to Selective Transformation and Precipitation under solid-liquid-solid moistening conditions is transported to a washing tank, where the concentrate is subjected to a Washing step with an acidulated solution or chloride and acid, to obtain the soluble copper. After washing, the solution is filtered and the concentrate is recovered and dried in order to begin with a new cycle of the process, if the total copper extraction is insufficient.

Chlorinated Washing Conditions:
  a) Concentrations of sodium chloride between 0 and 200 g/L.
  b) pH between 0.5 and 3.
  c) Washing time between 2 to 45 minutes.

The concentrate was subjected to the Selective Transformation and Precipitation Step in a solid-liquid medium, and the washing consists in filtering the solution, in order to recover the concentrate and obtain the solution rich in the chemical species of interest, to be dried later and again processed, as long as the extraction of the total copper in this first step has not been sufficient.

The steps of Moistening and Solvation, Selective Transformation and Precipitation and Acid-Chlorinated Washing can be repeated as many times as necessary, as long as the moistening in the presence of chloride is promoted again, in order to reach the maximum solubilization of the copper contained in the concentrate.

Description of the Preferred Modalities

The present invention discloses a method for the solubilization of metals from ores and/or concentrates of sulphide ores of primary and/or secondary origin comprising said metals, which includes the following sequential and/or overlapped steps:

I. Moistening and Solvation, which corresponds to a step in a non-oxidative environment, where the ore or concentrate is wetted by the addition of water, or acid-water, in the presence of chloride salt, without adding oxidizing or reducing agents, wherein this step includes the contact of the ore or concentrate with recirculating solutions of the same process that may contain chloride, iron and copper Ions, in an unsaturated environment;

II. Selective Transformation and solid-liquid-solid precipitation, which corresponds to a chemical and physical step that does not depend on the redox potential and it is conducted in a wide range of pH, where the ore or concentrate in the presence of water, or water and acid is transformed into chlorinated soluble species of copper, which precipitate on the ore or concentrate, and this step is carried out under a condition of chloride supersaturation, a condition that is achieved by periods of no irrigation and evaporation, favoring the phenomena of haloclasty and crystallization of salts; and III. Acid-Chlorinated Washing, which corresponds to a non-oxidative washing step, wherein an acidulated solution is added with or without sodium chloride to remove the soluble, chlorinated, copper species precipitated in the second step of the process, and the concentration of optimal chloride and moisture of the ore bed or concentrate are restored;

wherein the three steps are carried out independently of the REDOX potential of the medium.

In an embodiment of the invention, the chloride is added in step I as a solid or solution in the form of sodium chloride or chloride ion in the solution.

In a preferred embodiment of the invention, the amount of sodium chloride that is added in step I ranges from 20 to 80 kg per ton of material, preferably between 40 and 60 kg/t.

In another embodiment of the invention, the addition of sulfuric acid in step I ranges from 0 to 30 kg per ton of material.

In another embodiment of the invention, steps I and the step II can be carried out only with the addition or presence of water.

In an embodiment of the invention, the final moisture of the agglomerated ore in step I may range between 6 and 20%, preferably between 8 and 13%.

In another embodiment of the invention, the final moisture of the ore in step II should range between 6 and 10%, preferably between 8 and 11%.

In another embodiment of the invention, the supersaturation condition of species and salts in step II is achieved by periods of no irrigation and evaporation.

In another embodiment of the invention, step II does not require the injection of air or the aeration by constant irrigation, since in this step there is no irrigation for long periods of time; that is the reason why the supersaturation condition is enhanced.

In a preferred embodiment of the invention, the addition of water and acid in step I is carried out separately or together, preferably together.

In another embodiment of the invention, after step I, the ore is subjected to a period of non-irrigation and resting that lasts between 15 to 90 days, where the condition of chloride supersaturation is generated, whereas the crystallization of salts takes place as well as the Selective Transformation of the ore and Precipitation of soluble species of copper.

In another embodiment of the invention, the ore in step III is washed by continuous or intermittent irrigation with a solution containing acidulated water, or acid and chloride.

In a preferred embodiment of the invention, in step III of Acid-Chlorinated Washing, by means of limited or prolonged irrigation, the presence of Cu(I) or Cu(II) can be promoted through limited or prolonged irrigation, respectively.

In one embodiment of the invention, steps I, II and III can be repeated one or more successive times, depending on the existence of metal ions of Interest to be extracted.

In a preferred embodiment of the invention, the metals to be solubilized are selected from the group including copper, zinc, nickel, molybdenum, cobalt, and lead, among others.

In another embodiment of the invention, the solubilization of copper can also take place from sulphide-containing ores with arsenical contents and/or concentrates of sulphide-containing ores with arsenical contents comprising copper.

In another embodiment of the invention, the ore to be solubilized can be crushed by conventional crushing or HPGR, before step I, but preferably by HPGR.

In another embodiment of the invention, the step I of Moistening and Solvation, the step II of Selective Transformation and Precipitation and the step III of Acid-Chlorinated Washing can be applied to copper concentrates.

In another embodiment of the invention, chloride ions can be incorporated into the process in the form of sodium chloride, potassium chloride, magnesium chloride, ferrous chloride, or through the use of recirculation solutions of the process that contain chloride, iron and copper.

In another embodiment of the invention, the solubilization of copper can also take place from sulphide copper secondary ores.

In an embodiment of the invention, the solubilization condition in step II is solid-liquid-solid.

In another preferred embodiment of the invention, the steps I of Moistening and Solvation and the step II of Selective Transformation and Precipitation can be carried out at pH between 0.5 and 7.

In another embodiment of the invention, step II of Selective Transformation and Precipitation can be carried out by solid-liquid and solid-liquid-solid conditions, preferably in a solid-liquid-solid state.

In a preferred embodiment of the invention, the steps I of Moistening and Solvation, the step II of Selective Transformation and Precipitation, and the step III of Acid-Chlorinated Washing can be carried out at potentials inferior to 700 mV or about 700 mV (Eh).

In a preferred embodiment of the invention, the step III of Add-Chlorinated Washing can be carried with a reused solution with the presence of chloride and iron ions.

In another preferred embodiment of the invention, the chloride salt may be derived from seawater, brine from desalination plants, halite, bischofite and commercial sodium chloride.

In a preferred embodiment of the invention, the steps I of Moistening and Solvation, the step II of Selective Transformation and Precipitation, and the step III of Acid-Chlorinated Washing can be carried out at room temperature, preferably between 20 to 35° C.

EXAMPLES OF APPLICATION

Example 1: Mineralogy of Three Copper Ores

Table 1 shows the quantitative mineralogical analysis obtained for three head samples of primary copper ores, denominated as ore No. 1, No. 2, and No. 3. For the analysis, optical microscopy was used, supported by sequential copper chemical analysis. For this purpose, briquettes were prepared using approximately 3 grams of ore; subsequently, the briquette was polished and roughed down.

To determine the mineralogical composition the statistical method of point counting was used. The mineralogical analysis by total copper Indicated that there were ores of low and high grade; however, the analysis by copper species showed that the percentage of chalcopyrite is 99.79%, 93.7% and 45%, respectively, for ores No. 1, No. 2 and No. 3.

TABLE 1

| Species | Ore 1 % | Ore 2 % | Ore 3 % |
|---|---|---|---|
| Total copper grade | 0.24 | 1.05 | 0.36 |
| Chalcopyrite | 99.79 | 93.7 | 45 |
| Bornite | 0.13 | 1 | — |
| Tennantite | 0.08 | 0.8 | — |
| Chalcocite | — | 2.9 | 21 |
| Covellite | — | 1.6 | 14 |
| Atacamite | — | — | 4 |
| Malachite | — | — | 16 |

Example 2: Extraction of Copper in Relation to the Form of Addition of Water and Add in the Moistening and Solvation Step, Using the Ores No. 1 and No. 2

The results of FIG. 1 were obtained in column tests, using ores No. 1 and No. 2, which have a total copper grade of 0.24% and 1.05%, respectively (see Table 1). The ores were subjected to a traditional crushing process until achieving a particle size 100% under h inch.

Subsequently, six ore loads were prepared, of which three loads were from ore No. 1 and the other three loads from ore No. 2. The ores were then subjected to the Moistening and Solvation step, and were agglomerated and cured by the addition of acid and water together, acid and water separately and only water. The addition of sodium chloride for all tests was performed in solid form directly on the ore. Once the ore was wetted, the column was loaded and the Selective Transformation and Precipitation Step began.

The conditions of the Moistening and Solvation step were the following:

Moistening and Solvation (Water and Acid Separately)
  a) Addition of 60 kg/t of sodium chloride.
  b) Addition of 10 kg/t of sulfuric acid.
  c) Moisture of 9.6%.
  d) Temperature of 25° C.

Moistening and Solvation (Water and Acid Together)
  a) Addition of 60 kg/t of sodium chloride.
  b) Addition of 10 kg/t of sulfuric acid
  c) 10% Moisture.
  d) Temperature of 25° C.

Moistening and Solvation (Water Only)
  a) Addition of 60 kg/t of sodium chloride.
  b) Addition of 60 kg/t of water.
  c) Moisture of 9%.
  d) Temperature of 25° C.

All tests were subjected to the Selective Transformation and Precipitation step for a period of 45 days. Once the period of Selective Transformation and Precipitation was concluded, the third step of the process, called Acid-Chlorinated Washing, was initiated at an irrigation rate of 7 L/h/m² and with a sodium chloride solution of 200 g/L at pH 0.5.

The results can be seen in FIG. 1, where it can be Identified that the tests that were performed with the addition of water and acid together achieved greater extraction. However, the tests that were wetted with water only achieved an extraction close to the value of those that were wetted with water and acid together, thus indicating that the process does not depend on curing; therefore, the first step could also be carried out only in the presence of water, and as a result, without the curing process.

Example 3: Extraction of Copper in Relation to the Concentration of Sodium Chloride in the Selective Transformation and Precipitation Step Using Ore No. 1

Figure 2:
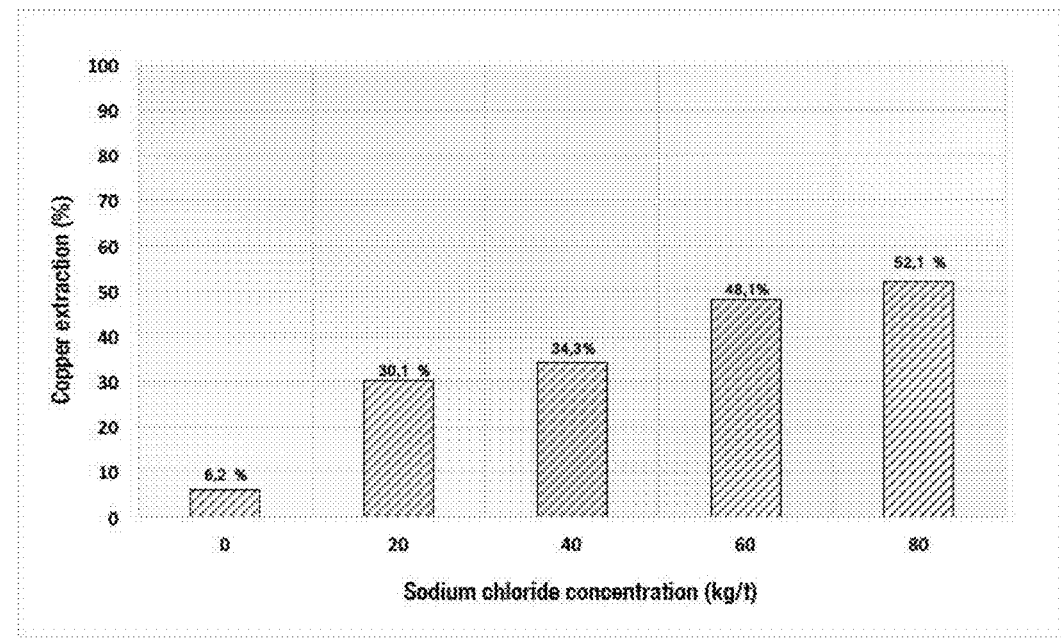
FIG. 2 shows a copper-extraction chart in relation to the concentration of sodium chloride in the Selective Transformation and Precipitation Step using ore No. 1.

The results of FIG. 2 were obtained in column tests, using ore No. 1, which has a total copper grade of 0.24% and a copper percentage of 98.1% of chalcopyrite (see Table 1).

The ore was subjected to a traditional crushing process until achieving a particle size 100% under ½ inch. Subsequently, five loads of ore No. 1 were prepared, and then the ore loads were subjected to the Moistening and Solvation step, with the addition of water and acid together. The addition of sodium chloride was in direct solid form on the ore with the following concentrations and conditions.
  a) 0, 20, 40, 60, 80 kg/t of NaCl.
  b) Acid addition of 10 kg/t.
  c) Addition of water of 60 kg/t.
  d) Moisture of 9.5%.
  e) Temperature of 25° C.

Once the Moistening and Solvation step was completed, the Selective Transformation and Precipitation Step began, for a period of 45 days, where there was no irrigation. Once the second step was concluded, the third step of Acid-Chlorinated Washing was initialized at an irrigation rate of 5 L/h/m2 for 12 hours and with a sodium chloride solution of 200 g/l at pH 1.

The results can be seen in FIG. 2, where it can be observed that a higher concentration of sodium chloride in the first step of the method allows achieving a greater extraction of copper in the Selective Transformation and Precipitation Step.

Example 4: Extraction of Copper in Relation to the Time of Selective Transformation and Precipitation Using Ore No. 1

Figure 3:
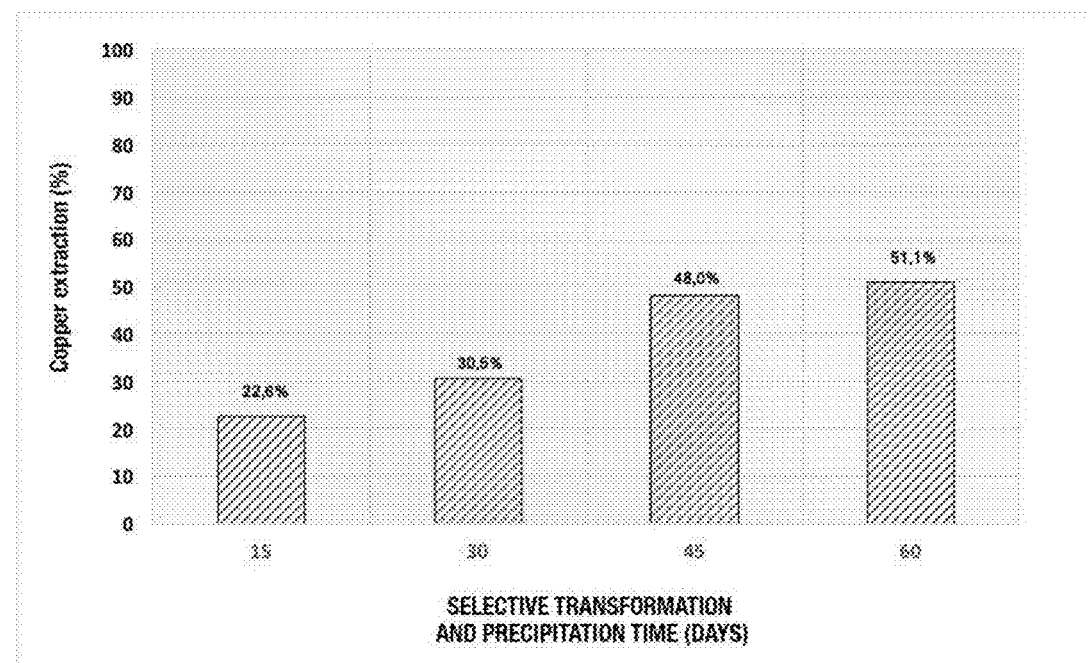
FIG. 3 shows a copper-extraction chart in relation to the time of Selective Transformation and Precipitation using ore No. 1.

The results of FIG. 3 were obtained in column tests, using ore No. 1, which has a total copper grade of 0.24% and a percentage by copper species of 98.1% of chalcopyrite (see Table 1).

The ores were subjected to a traditional crushing process until achieving a particle size 100% under ½ inch. Subsequently, four loads of ore No. 1 were prepared, and then all ore loads were subjected to the Moistening and Solvation step, where the agglomeration and curing was carried out with the addition of water and acid together. The addition of sodium chloride was in direct solid form on the ore with the following concentrations and conditions.
  a) Addition of 60 kg/t of NaCl.
  b) Acid addition of 10 kg/t.
  c) Addition of water of 60 kg/t.
  d) Moisture of 9.6%.
  e) Temperature of 25° C.

Once the Moistening and Solvation step was completed, the Selective Transformation and Precipitation step was Initialized for different periods of time 15, 30, 45 and 60 days. Once the stipulated time period of the second step was completed, the third Acid-Chlorinated Washing Step was initialized with an irrigation rate of 5 L/h/m2 and with a sodium chloride solution of 120 g/l at pH 1.

The results can be seen in FIG. 3, where it is observed that there is an increase in copper extraction as the time of Selective Transformation and Precipitation increases.

Example 5: Extraction of Copper in Relation to the Consumption of Acid in the Step Selective Transformation and Precipitation Using Ore No. 1

Figure 4:
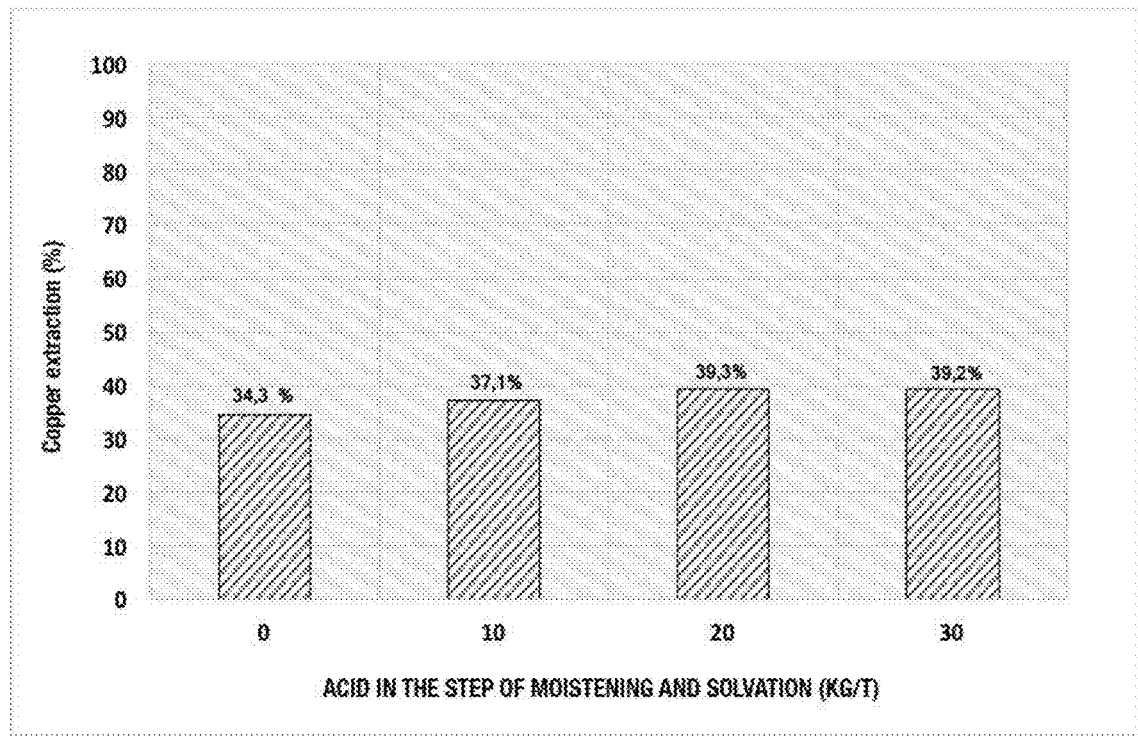
FIG. 4 shows a copper-extraction chart in relation to acid consumption in the Selective Transformation and Precipitation step using ore No. 1.

The results of FIG. 4 were obtained from tests in columns, using ore No. 1, which has a total copper grade of 0.24% and a percentage by copper species of 98.1% of chalcopyrite (see Table 1).

The ores were subjected to a traditional crushing process until achieving a particle size 100% under ½ inch. Subsequently, four loads of ore No. 1 were prepared, and then all ore loads were subjected to the Moistening and Solvation step, where the agglomeration and the agglomeration and curing were carried out, with the addition of water, and water and acid together. The addition of sodium chloride was in direct solid form on the ore with the following concentrations and conditions.

The conditions of the Moistening and Solvation step were the following:
  a) Addition of 60 kg/t of sodium chloride.
  b) Addition of 0, 10, 20 and 30 kg/t of sulfuric acid.
  c) Moisture of 8.7%.
  e) Temperature of 25° C.

Once the Moistening and Solvation step was completed, the Selective Transformation and Precipitation Step began for a period of 45 days. Once the stipulated time of the second step was completed, the third step of Acid-Chlorinated Washing was initialized with an irrigation rate of 7 L/h/m² and with a sodium chloride solution of 120 g/l at pH 1.

The results can be seen in FIG. 4, where it can be identified that the increase of the acid concentration in the Moistening and Solvation step does not have a relevant effect on the extraction of copper in the Selective Transformation and Precipitation step. In addition, the test that was performed only with the presence of water confirms that the method does neither depend on the concentration of acid, and therefore, nor on curing, which differs from the state of the art.

Example 6: Extraction of Copper in Relation to the Percentage of Moisture Imposed in the Moistening and Solvation Step Using Ore No. 1

Figure 5:
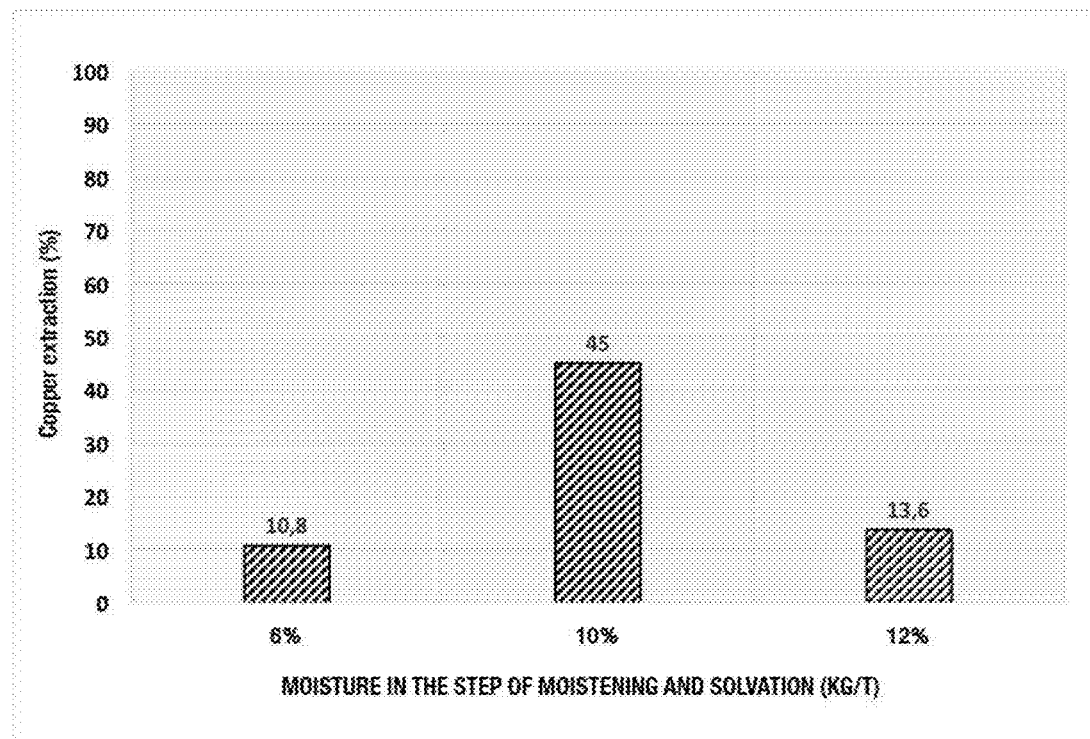
FIG. 5 shows a copper-extraction chart in relation to the percentage of moisture imposed in the Moistening and Solvation Step using ore No. 1.

The results of FIG. 5 were obtained in tests in columns, using ore No. 1, which has a total copper grade of 0.24% and a percentage by copper species of 98.1% of chalcopyrite (see Table 1). The ores were subjected to a traditional crushing process until achieving a particle size 100% under ½ inch. Subsequently, three loads of ore No. 1 were prepared.

Subsequently, each of the ore loads was agglomerated and cured with the addition of water and acid together, imposing different moisture on each test. The addition of sodium chloride was in direct solid form on the ore with the following conditions.

a) Percentages of moisture 6, 10 and 12%.
b) Addition of 60, 110 and 140 kg/t of sulfuric acid and water.
c) Addition of 60 kg/t of sodium chloride.
d) Selective-Transformation Time and Precipitation of 45 days.
e) Temperature of 25° C.

Once the stipulated time of the second step finished, the third Acid-Chlorinated Washing Step was initialized with an irrigation rate of 7 L/h/m$^2$ and with a sodium chloride solution of 120 g/L at pH 1.

The results can be seen in FIG. 5, where it can be observed that the moisture percentage imposed in the Moistening and Solvation step has an important effect on the performance of the Selective Transformation and Precipitation step, achieving a greater extraction of copper with moisture of 10%.

Example 7: Extraction of Copper in Relation to a Second Cycle of Selective Transformation-Precipitation and Acid-Chlorinated Washing, Using Ore No. 1

Figure 6:
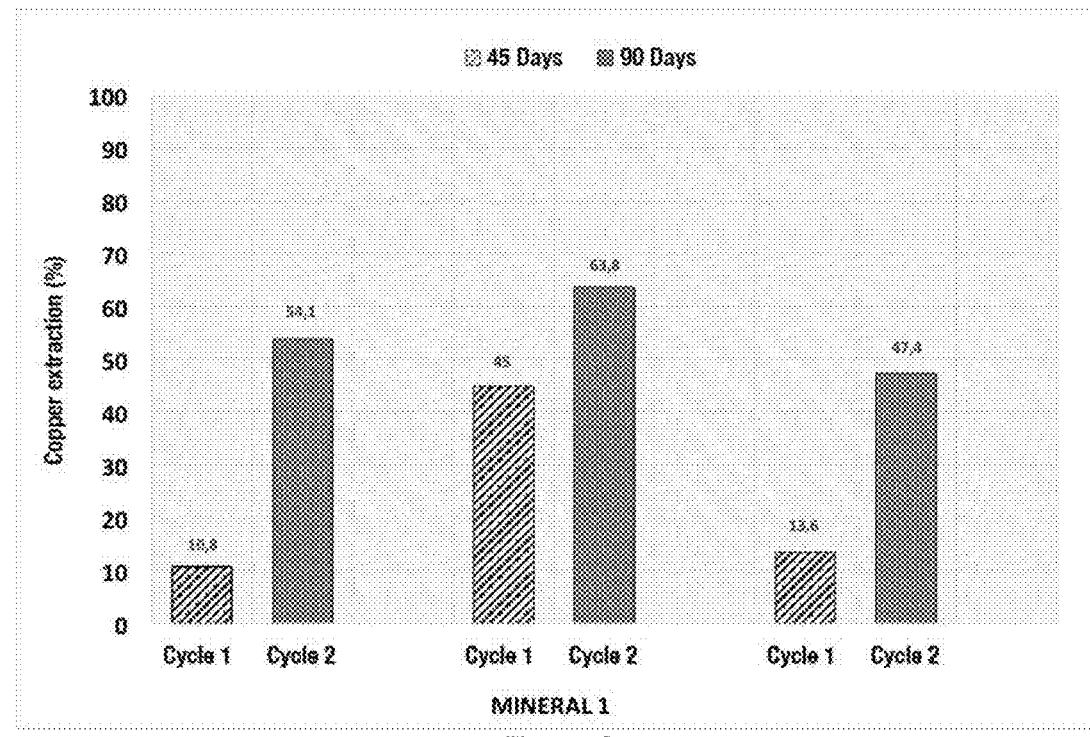
FIG. 6 shows a copper-extraction chart in relation to a second cycle of Selective Transformation-Precipitation and Acid-chlorinated Washing using ore No. 1.

The results of FIG. 6 were obtained by the continuation of the tests of Example 6. After the first dissolution cycle, which concluded with the first Chloride Washing, a second cycle of the method was carried out, through a new period of Selective Transformation and Precipitation, and Add-Chlorinated Washing, in order to evaluate copper extraction and identify if there was passivation of the ore during the application of a second cycle.

Conditions of the Second Cycle of the Method:
a) Selective-Transformation Time and Precipitation of 45 days.
b) Acid-Chlorinated Washing Solution of 120 g/L at pH 1.
c) Temperature of 25° C.

The results can be seen in FIG. 6, where it can be observed that a second cycle of Selective Transformation and Precipitation increases the copper extraction, without observing stagnation by passivation of the ore surface. The decrease in extraction could be due to the fact that the extraction rate for heterogeneous reactions is not constant and will always decrease over time, independent of some passivation effect. In addition, it can be observed that the test with moisture of 6% in the first cycle, which had a low extraction, improved its performance significantly, once the moisture was reinstated by the first irrigation.

Example 8: Extraction of Copper in Relation to the Percentage of Moisture Imposed in the Moistening and Solvation Step, Using Ore No. 2

Figure 7:
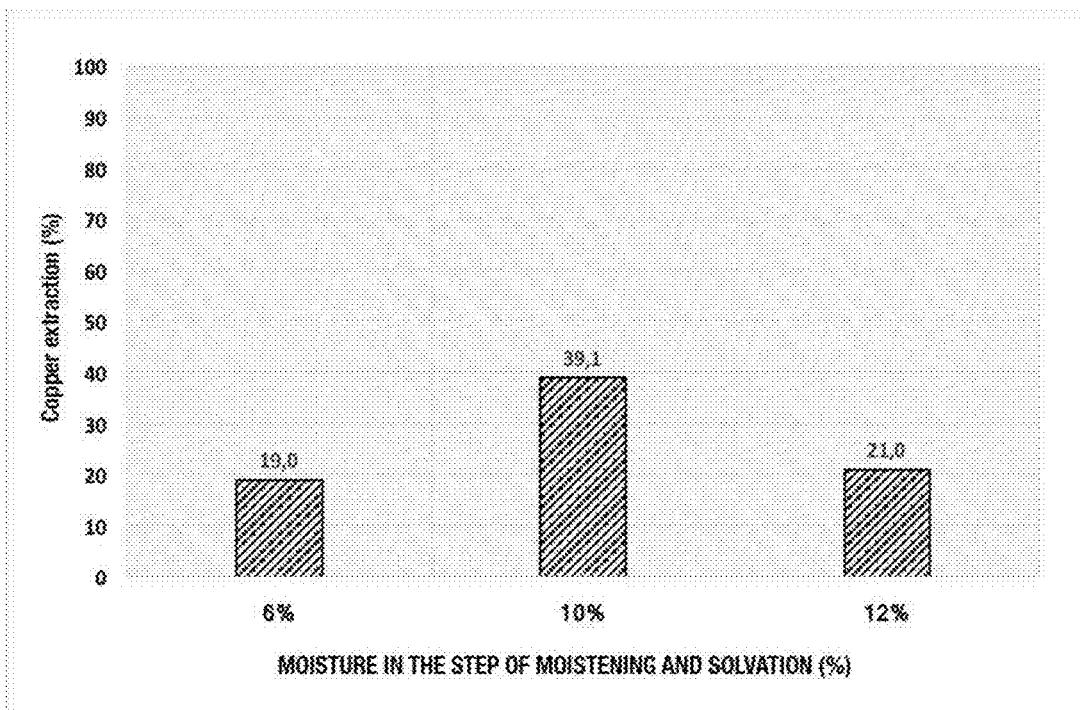
FIG. 7 shows a copper-extraction chart in relation to the percentage of moisture imposed in the Moistening and Solvation step using ore No. 2.

The results of FIG. 7 were obtained in column tests, using ore No. 2, which has a total copper grade of 1.05% and a percentage by copper species of 93.7% of chalcopyrite (see Table 1).

The ores were subjected to a traditional crushing process until achieving a particle size 100% under ½ inch. Subsequently, three loads of ore No. 2 were prepared, then each of the ore loads were subjected to the Moistening and Solvation step, where the agglomeration and curing process was carried out with the addition of water and acid together, imposing to each test a different moisture. The addition of sodium chloride was in direct solid form on the ore with the following conditions:

a) Percentages of moisture 6, 10 and 12%.
b) Addition of 65, 110 and 140 kg/t of sulfuric acid and water.
c) Addition of 60 kg/t of sodium chloride.
d) Selective-Transformation Time and Precipitation of 45 days.
e) Temperature of 30° C.

Once the stipulated time of the second step finished, the third Acid-Chlorinated Washing Step was initialized with an irrigation rate of 7 L/h/m$^2$ and with a sodium chloride solution of 120 g/L at pH 1.

The results can be seen in FIG. 7, where it can be identified that—as with ore No. 1 in example 6, the percentage of moisture imposed in the step of moistening and solvation to ore No. 2 has an important effect on the performance of the Selective Transformation and Precipitation Step, achieving a greater extraction of copper with a moisture of 10%.

Example 9: Extraction of Copper in Relation to a Second Cycle of Selective Transformation-Precipitation and Acid-Chlorinated Washing Using Ore No. 2

Figure 8:
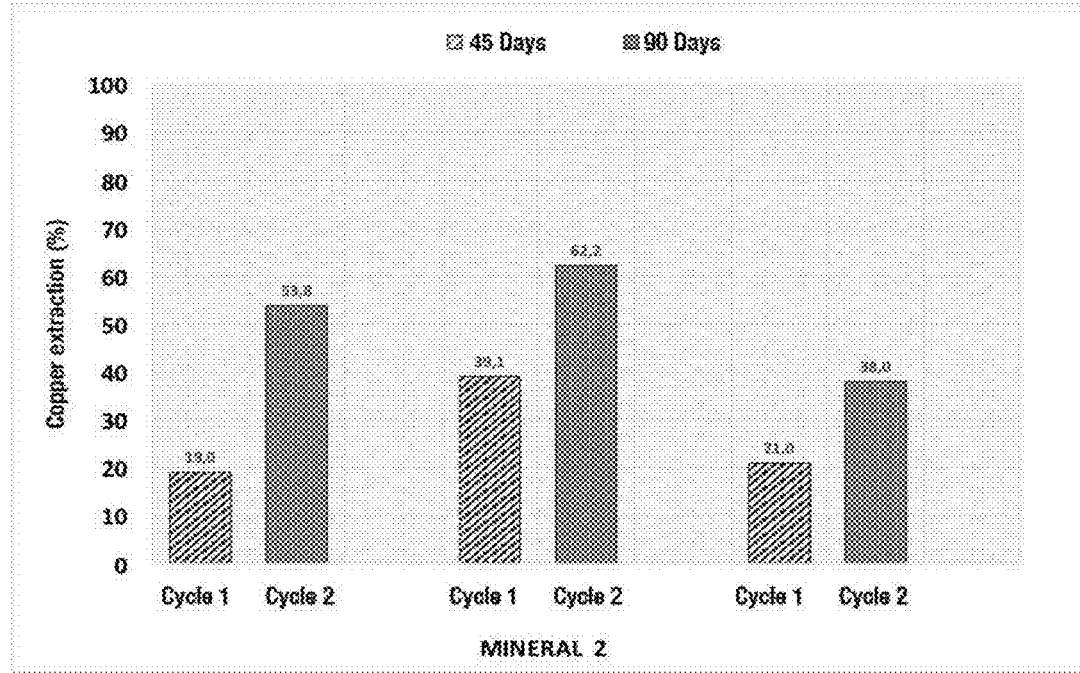
FIG. 8 shows a copper-extraction chart in relation to a second cycle of Selective Transformation-Precipitation and Acid-Chlorinated Washing using ore No. 2.

The results of FIG. 8 were obtained by continuing the tests of Example 8, applying a second cycle of the method.

After the first dissolution cycle that concluded with the first Acid-Chlorinated Washing, a second dissolution cycle was carried out, through a second period of Selective Transformation-Precipitation and Acid-Chlorinated Washing, in order to evaluate the copper extraction and to identify if there was a passivation effect during the application of a second cycle of the method.

Conditions of the Second Cycle:
a) Selective-Transformation Time and Precipitation 45 days.
b) Temperature of 25° C.

Once the second period of 45 days of no irrigation was completed, the second Acid-Chlorinated Washing was initialized with an irrigation rate of 10 L/h/m2 and with a sodium chloride solution of 120 g/L at pH 1.

The results can be seen in FIG. 8, where it can be identified that a second cycle of Selective Transformation and Precipitation maintains the copper-extraction increase and there is no stopping of extraction by passivation of the ore surface; although the extraction is inferior to the one of the first cycle, it does not stop. In addition, it can be observed that—as occurs with ore No. 1, the test with moisture of 6% in the first cycle, which had a low extraction, significantly increased the extraction in this second period of the method, due to moisture achieved by the first irrigation.

Example 10: Extraction of Copper Against the Type of Crushing Using Ore No. 2, Roll and Jaw Crusher in Front of a High Pressure Grinding Rollers (HPGR) Crusher The results of FIG. 9 were obtained in column tests, using ore No. 2, which has a total copper grade of 1.05% and a percentage by copper species of 93.7% of chalcopyrite (see Table 1).

The ore was prepared mechanically using two types of crushing. The first crushing process corresponds to a primary roller crusher and a secondary jaw crusher (traditional), where the first ore composite was brought to a particle size 100% under ½ inch. For the case of the mechanical preparation by HPGR crushing, three composites of 150 kg of ore were formed, each composite was subjected to a different pressure of 40, 60 and 80 kg/cm$^2$, once the ore was crushed, the loads with a particle size 100% under ½ Inch were prepared.

After the mechanical preparation, the 4 composites were subjected to the Moistening and Solvation step, where the ore was subjected to the agglomeration and curing process, with the addition of water and acid together. The addition of sodium chloride was in direct solid form on the ore with the following conditions.

Conditions in the Moistening and Solvation step:
a) Addition of 60 kg/t of sodium chloride.
b) Addition of 90 kg/t of sulfuric acid and water.
c) Percentages of moisture: 10%.

Once the ore was agglomerated and cured, the second step of the process was initialized, where the ore was subjected to a first period of Selective Transformation and Precipitation for 45 days. Once this time for the second step was completed, the Acid-Chlorinated Washing Step was initialized with an irrigation rate of 10 L/h/m$^2$ and with a sodium chloride solution of 200 g/L at pH 1, concluding thus the first cycle of the process. Once the Chloride Washing was concluded, the ore was subjected to a second period of Selective Transformation and Precipitation for another 45 days. Once the second period of step II was completed, the second Chloride Washing was initialized with an irrigation rate of 10 L/h/m$^2$ and with a sodium chloride solution of 200 g/L at pH 1.

Figure 9:
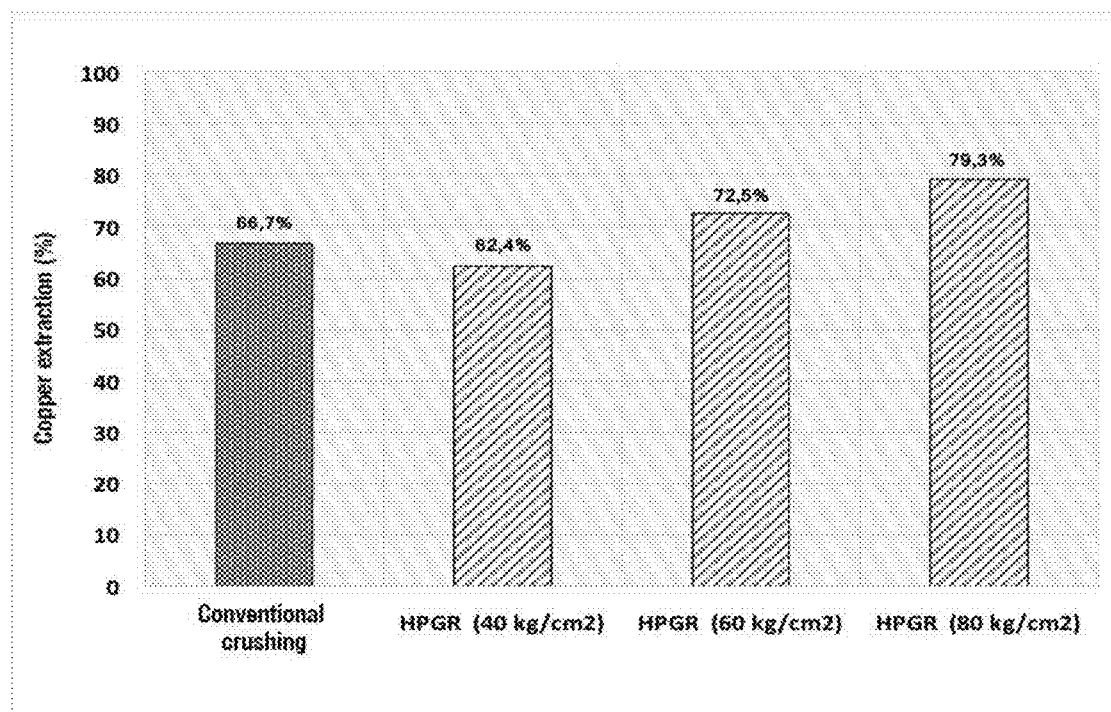
FIG. 9 shows a copper-extraction chart versus the type of crushing using ore No. 2, roll and jaw crusher in front of a High-Pressure Grinding Rollers (HPGR) crusher.

The results can be seen in FIG. 9, wherein after applying two cycles of the method, copper extraction was greater for the ore crushed by HPGR (80 kg/cm$^2$), achieving 12.6% more than the ore that was crushed by the traditional way. A higher level of fracturing in the ore favors the extraction of copper under the conditions indicated and by the method suggested.

Example 11: Extraction of Copper in Relation to the Percentage of Moisture Imposed in the Moistening and Solvation Step Using Ore No. 3

Figure 10:
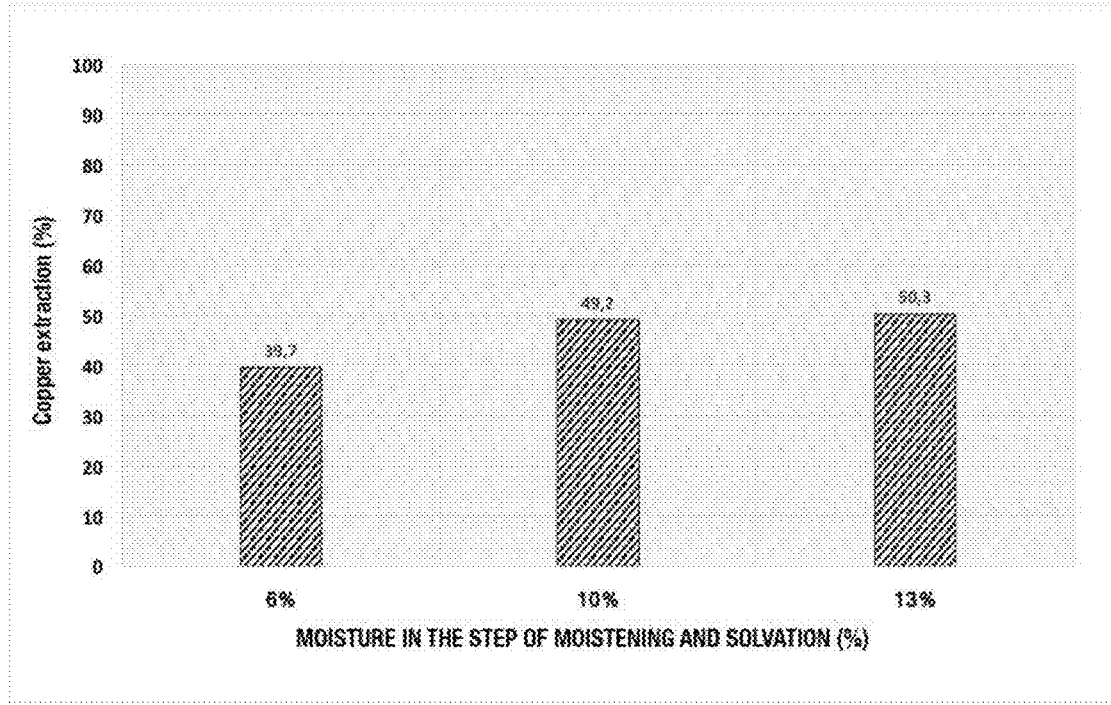
FIG. 10 shows a copper-extraction chart in relation to the moisture percentage imposed in the Moistening and Solvation step using ore No. 3.

The results of FIG. 10 were obtained in column tests, using ore No. 3, which has a total copper grade of 0.36% and a percentage of 45% copper species of chalcopyrite (see Table 1). The ore was subjected to conventional crushing to achieve a particle size of 100% under ½ inch.

Subsequently, three loads of ore No. 3 were prepared. Immediately, each of the ore loads was subjected to the first step of the process, and the agglomeration and curing took place, with the addition of water and acid together, imposing different moisture on each test. The sodium chloride was in direct solid form on the ore under the following conditions:
a) Percentages of moisture 6, 10 and 13%.
b) Addition of 65, 110 and 140 kg/t of sulfuric acid and water.
c) Addition of 60 kg/t of sodium chloride.

Once the first step of the process was completed, the second Selective Transformation and Precipitation Step was Initialized for a period of 45 days, at room temperature. Once the stipulated time of the second step was completed, the third step of Acid-Chlorinated Washing was initialized, with a sodium chloride solution of 120 g/L at pH 1, and an irrigation rate of 7 L/h/m$^2$ for 12 hours.

The results can be seen in FIG. 10, where it can be observed that—as with ores No. 1 and No. 2, the percentage of moisture imposed in the Moistening and Solvation step using ore No. 3 has an important effect on the performance of the Selective Transformation and Precipitation Step achieving a greater extraction of copper with a moisture of 13% and 10%.

Example 12: Extraction of Copper in Relation to a Second Cycle of Selective Transformation and Precipitation and Acid-Chlorinated Washing Using Ore No. 3

Figure 11:
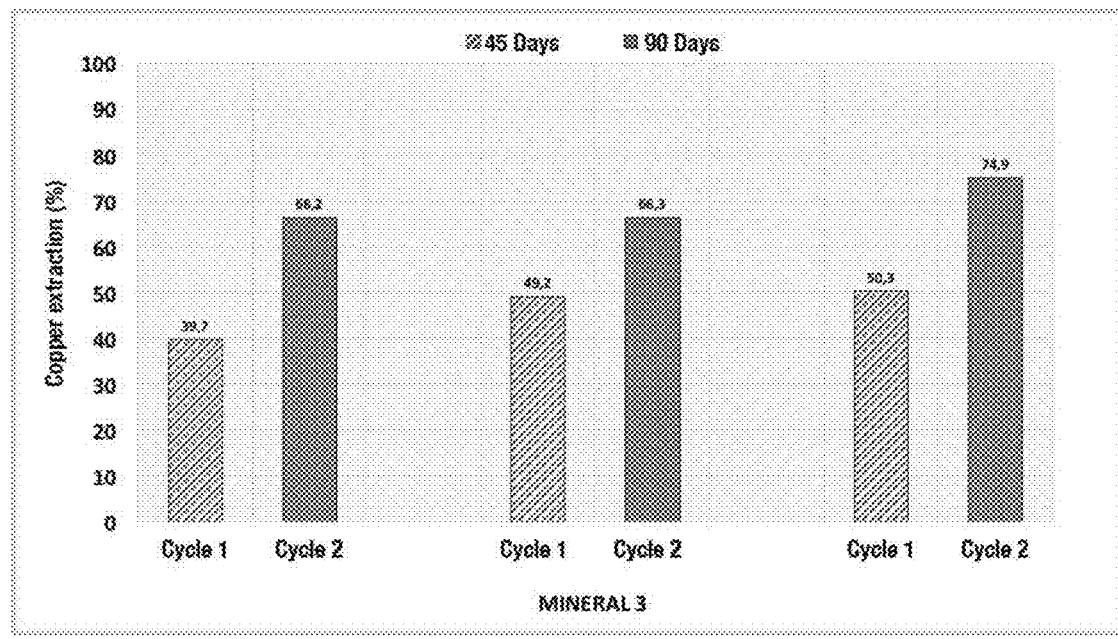
FIG. 11 shows a copper-extraction chart in relation to a second cycle of Selective Transformation and Precipitation and Acid-Chlorinated Washing using ore No. 3.

The results of FIG. 11 were obtained by continuing the tests of Example 11, applying a second cycle of the process for additional 45 days. After the first cycle of Transformation, which concluded with the first Chloride Washing, a second dissolution cycle was imposed, through a second period of selective transformation-precipitation and a second acid-chloride washing, in order to evaluate the extraction of copper during the application of a second cycle of the method.

Conditions of the second cycle of the method:
a) Selective-Transformation Time and Precipitation of 45 days.
b) Temperature of 25° C.

Once the second period of 45 days of no irrigation was completed, the second Add-Chlorinated Washing was initialized with an irrigation rate of 7 L/h/m$^2$ and with a sodium chloride solution of 120 g/L at pH 1.

Figure 12:
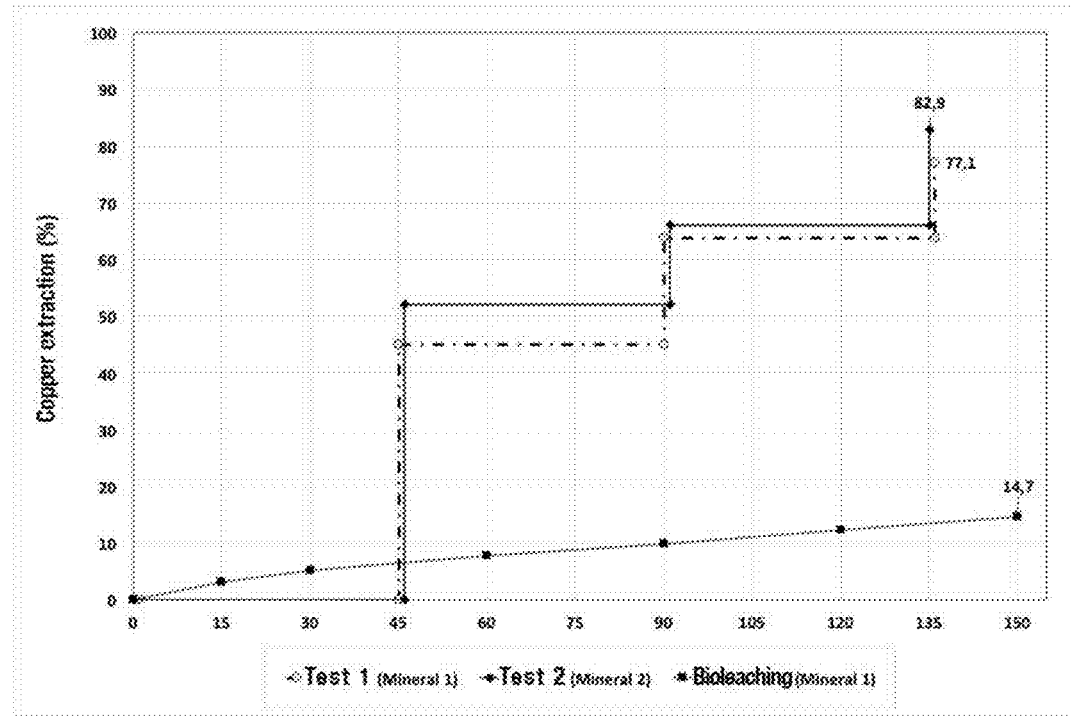
FIG. 12 shows a copper-extraction chart in relation to time, comparing the chemical process against bioleaching for a period of 135 and 150 days, respectively.

The results can be seen in FIG. 12, where it can be identified that a second cycle of Selective Transformation and Precipitation keeps on increasing the copper extraction, without observing a stoppage of the extraction due to the passivation of the ore surface. Although the extraction is inferior to the one of the first cycle, it does not stop. In addition, it is shown that the method can also solubilize secondary copper sulphides.

Example 13: Table of Parameters and Concentrations of Salts in Effluents of the First and Second Add-Chlorinated Washing of the Tests of Examples 6, 7, 8, 9, 11 and 12

The results of Table 2 were obtained from the effluents generated by the Add-Chlorinated Washing steps of the tests represented in the following Figures:
a) Figures and examples 5-6 and 6-7: Parameters and salts concentrations of the tests with ore No. 1, Chlorinated washing 1 and 2.
b) Figures and examples 7-8 and 8-9: Parameters and salts concentrations of the tests with the ore No. 2, Chlorinated Washing 1 and 2.
c) Figures and examples 10-11 and 11-12: Parameters and salts concentrations of the tests with ore No. 3, Chlorinated Washing 1 and 2.

The measurement of total copper (CuT) was made by atomic absorption spectroscopy. The solutions containing a copper concentration greater than 5 g/L were confirmed by volumetric technique. The measurement of Cu(I) was carried out using an iodometric technique.

The measurement of total iron (FeT) and ferrous ion were made using atomic absorption spectroscopy. The ferric ion concentration was calculated by subtracting the total iron to the ferrous ion concentration.

The determination of chloride (Cl) was carried out by the Morh method, by volumetrics and using silver nitrate 0.1 N (AgNO3) as titrant.

The results of all the solutions can be seen in Table 2 and the presence of cuprous and potential ions can be identified between 676.9 and 746.6 mV.

TABLE 2

| | CuT g/l | $Cu^{+1}$ g/l | $Cu^{+2}$ g/l | FeT g/l | $Fe^{+2}$ g/l | $Fe^{+3}$ g/l | Cl g/l | pH | Eh mV |
|---|---|---|---|---|---|---|---|---|---|
| Ore 1 (Wash 1) | 8.7 | 3.9 | 4.8 | 1.6 | 0.1 | 1.5 | 185.3 | 0.7 | 739.7 |
| Ore 1 (Wash 2) | 2.8 | 0.3 | 2.5 | 0.5 | 0.1 | 0.4 | 177.6 | 1.6 | 676.9 |
| Ore 2 (Wash 1) | 17.4 | 9.5 | 7.9 | 5.2 | 0.3 | 4.9 | 181.9 | 0.2 | 718.5 |
| Ore 2 (Wash 2) | 5.5 | 0.2 | 5.3 | 5.5 | 0.6 | 4.9 | 159.7 | 0.5 | 706.6 |
| Ore 3 (Wash 1) | 9.1 | 3.1 | 6.0 | 3.5 | 0.2 | 3.4 | 177.6 | 0.5 | 746.6 |
| Ore 3 (Wash 2) | 1.9 | 1.87 | 0.03 | 1.4 | 0.3 | 1.1 | 161.5 | 0.9 | 701.3 |

Example 14: Extraction of Copper in Relation to Time, Comparing the Chemical Process Against Bioleaching for a Period of 135 and 150 Days, Respectively The results of FIG. 12 were obtained in tests in columns, using ore No. 1 and No. 2, which have different grades of total copper; being the ore No. 1 of low-grade and No. 2 of high grade (see Table 1). Both ores were subjected to a crushing process, where ore No. 1 was treated by traditional crushing and ore No. 2 was crushed by HPGR at a pressure of 80 kg/cm$^2$ until a particle size of 100% under h inch was obtained, and the generated granulometric fractions (−½"/+¼", −¼+#10 and −#10) were quantified for the preparation of the loads. Each test was left with three granulometric fractions, in order to evaluate the extraction of copper in each particle size.

Subsequently, three ore loads were prepared; two of them were prepared with ore No. 1 and the third one was prepared using ore No. 2. Subsequently, one of the loads of ore No. 1 (test 1) and another one of No. 2 (test 2) were subjected to the Moistening and Solvation step, where the agglomeration and curing were performed with the addition of water and acid together. The addition of sodium chloride was in direct solid form on the ore with the following concentrations and conditions.

a) Addition of 60 kg/t of NaCl (test 1).
b) Addition of 80 kg/t of NaCl (test 2).
c) Addition of acid and water of 90 kg/t.
d) Moisture of the ore No. 19.6% and No. 2 10%.
e) Room temperature.

The second load of ore No. 1 was prepared for the bioleaching process, subjecting the ore to a process of agglomeration and curing, wherein water was first added and then the sulfuric acid, allowing the ore to rest for 15 days.

a) Addition of 14 kg/t of sulfuric acid.
b) Granulometry 100% under half an inch.
c) Cell concentration of the inoculum 1.2×10$^8$ cells per ml.
d) FOX Bravo Oxidizing Iron Consortium (KCTC 13487BP) and SOX Bravo Oxidant Sulfur (KCTC 13488BP).
e) Temperature of 30° C.

Once the first resting step for the bioleaching test and the moistening and solvation step for tests 1 and 2 was completed, the Selective Transformation and Precipitation Step was initiated for the chemical tests, for a period of 45 days. However, for the bioleaching test, the resting time was 30 days. Once the stipulated time period of the second step for the ores that was subjected to the chemical process finished, the third step of Acid-Chlorinated Washing was initialized with an irrigation rate of 7 L/h/m2 for test 1, and of 10 L/h/m$^2$ for test 2, during 12 hours, using in both irrigations a sodium chloride solution of 200 g/l at pH 1. For the case of the bioleaching test, the irrigation was at a rate of 7 L/h/m$^2$ with an acidulated solution at pH 1.5, and a cell concentration of 7.2×10$^7$ cells/mL.

Once the irrigation for the bioleaching test and Acid-chlorinated Washing for the chemical process were completed, the first cycle of the test was concluded. Subsequently, for the tests that were submitted to the chemical process, steps II and III were repeated for another two cycles during a total period of time of 135 days. In the case of the bioleaching test, the resting and irrigation steps were repeated for 5 periods for a total time of 150 days.

The results of the three tests can be seen in FIG. 12, wherein it can be concluded that the tests that were submitted to the Solid-Liquid-Solid chemical process resulted in a significantly higher extraction than the bioleaching, with only 3 cycles of the method in 135 days In addition, the phenomenon of passivation is not identified and outstanding extractions are obtained for ores with a high percentage of chalcopyrite. On the other hand, the test carried out with the ore No. 2 and crushed by HPGR achieved the highest extraction exceeding 80%.

Example 15: Extraction of Copper in Relation to the Irrigation Ratio, Comparing the Chemical Process Against Bioleaching for a Period of 135 and 150 Days, Respectively The results of FIG. 13 were obtained from tests 1, 2, and bioleaching of Example 14. The irrigation for all the tests lasted 12 hours at an irrigation rate of 7 L/h/m$^2$ for test 1 and bioleaching; however, the irrigation rate was of 10 L/h/m$^2$ for test 2.

Figure 13:
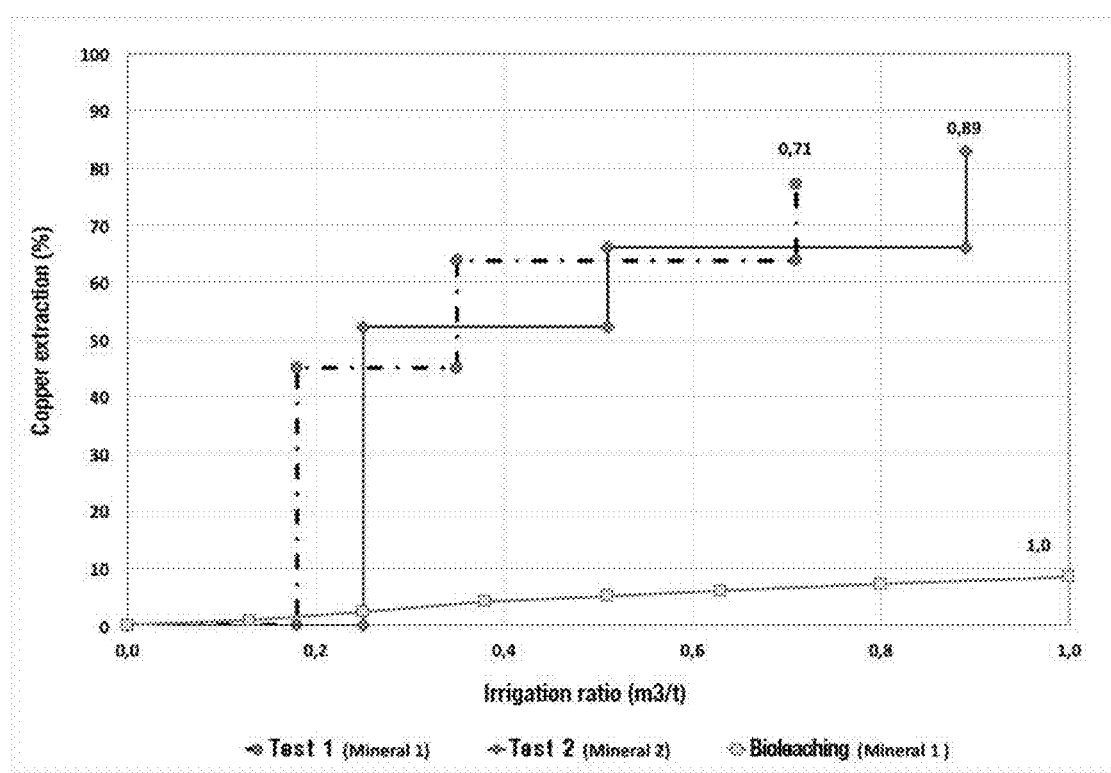
FIG. 13 shows a copper-extraction chart in relation to the irrigation ratio, comparing the chemical process against the bioleaching for a period of 135 and 150 days, respectively.

FIG. 13 shows that the chemical process has an irrigation ratio between 0.5 and 0.89 m$^3$/t, achieving a much higher extraction than the bioleaching test, which only achieved an extraction of 9%, with a ratio of irrigation of 1 m$^3$/t. These results show that the method has low water consumption.

Example 16: Extraction of Copper Based on Particle Size

Figure 14:
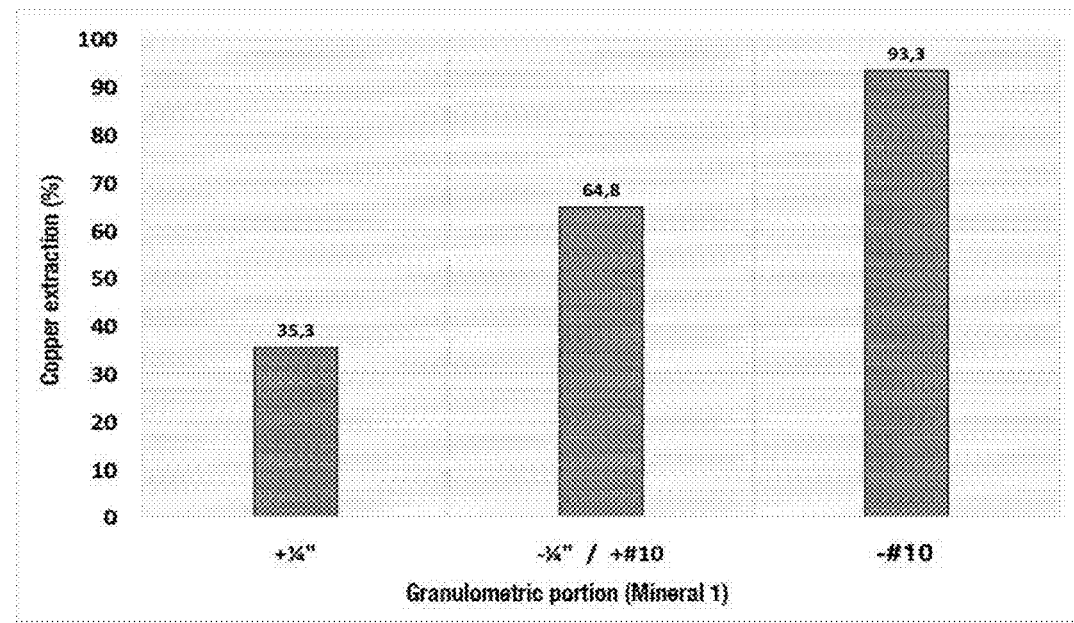
FIG. 14 shows a copper-extraction chart based on particle size.

The results of FIG. 14 were obtained from test 1 (ore No. 1 chemical process) of Example 14. Once the test period of 135 days concluded, the column was unloaded, and the gravel weighed. Subsequently, the gravel was dried and separated into the three granulometric fractions of interest (+¼, −¼+#10 and −#10), in order to evaluate the copper content for each granulometric fraction and compare the same with copper of the head ore, allowing to determine which particle size in the process achieved the highest copper extraction, as can be seen in FIG. 14.

The results indicate that, the lower the granulometric fraction, the greater the copper extraction; however, for larger portions (−¼/+#10) and (+¼") extraction is also important.

Example 17: Mineralogy of Two Primary Copper Concentrates

The results of Table 3 were obtained by means of quantitative mineralogical analysis of two representative samples of primary copper concentrates, denominated Conc. 1 and Conc. 2. For the analysis, optical microscopy was used, supported by sequential-copper chemical analysis. For this purpose, briquettes were prepared using approximately 3 grams of concentrate, and then the briquettes were polished and roughed down.

To determine the mineralogical composition, the statistical method of point counting was used. Mineralogical analysis indicated that the total copper law for Conc. 1 and Conc. 2 was 25.37 and 25.57%, respectively; however, the analysis by copper species showed that mainly Conc. 1 had 64.67% of chalcopyrite and 33.62% of bornite. On the other hand, Conc. 2 had a percentage of chalcopyrite of 80.03% and 12.14% of tennantite, as can be observed in Table 3.

TABLE 3

| Species | Concentrate 1 (%) | Concentrate 2 (%) |
| --- | --- | --- |
| Total copper grade | 25.37 | 25.57 |
| Chalcopyrite | 64.67 | 80.03 |
| Bornite | 33.62 | 5.66 |
| Tennantite | 0.22 | 12.14 |
| Enargite | — | 0.53 |
| Chalcocite | 0.40 | 0.11 |
| Covellite | 1.09 | 1.53 |

Example 18: Extraction of Copper Depending on the Type of Reaction Used for the Extraction of Copper from the Concentrate, During Steps I, II and III The results of FIG. 15 were obtained using two primary copper concentrates, called Conc. 1 and Conc. 2, which had a particle size distribution 100% between 75-106 microns, and a total copper percentage of 25.37. % and 25.57%, respectively (see Table 3). Subsequently, the masses of concentrates for the tests under 3 types of reaction were weighed, as described below.

A. Solid-Solid Reaction 50 grams of concentrate Conc. 1 and Conc. 2 were weighed, and then each concentrate was mixed with 20 g of sodium chloride, without adding water or acid. The concentrates mixed with sodium chloride were exposed to the environment for a period of 45 days at room temperature. Once the time of resting was concluded, the concentrate was washed with an acidulated solution for 30 minutes at 120 rpm, in order to evaluate if the solid-solid Interaction between sodium chloride and the concentrate could generate a dissolution or destabilization of the structure of copper sulphides only with the relative humidity of the environment. But, on the contrary, the copper extraction was low: only 8% for the Conc. 1 concentrate and 11% for the Conc. 2 concentrate, as can be seen in FIG. 15.

B. Solid-Liquid Reaction

To conduct the tests, 25 grams of each concentrate were weighed (Conc. 1 and Conc. 2), then each concentrate was taken to a 500 mL Erlenmeyer flask and 250 mL of acidulated solution was added at pH 1, with a concentration of 200 g/L of sodium chloride. Each test was performed in duplicate and placed under agitation at 120 rpm for 45 days at room temperature. On the other hand, during that period there was no pH adjustment and no solution replacement, and the solution vanished due to evaporation.

Figure 15:
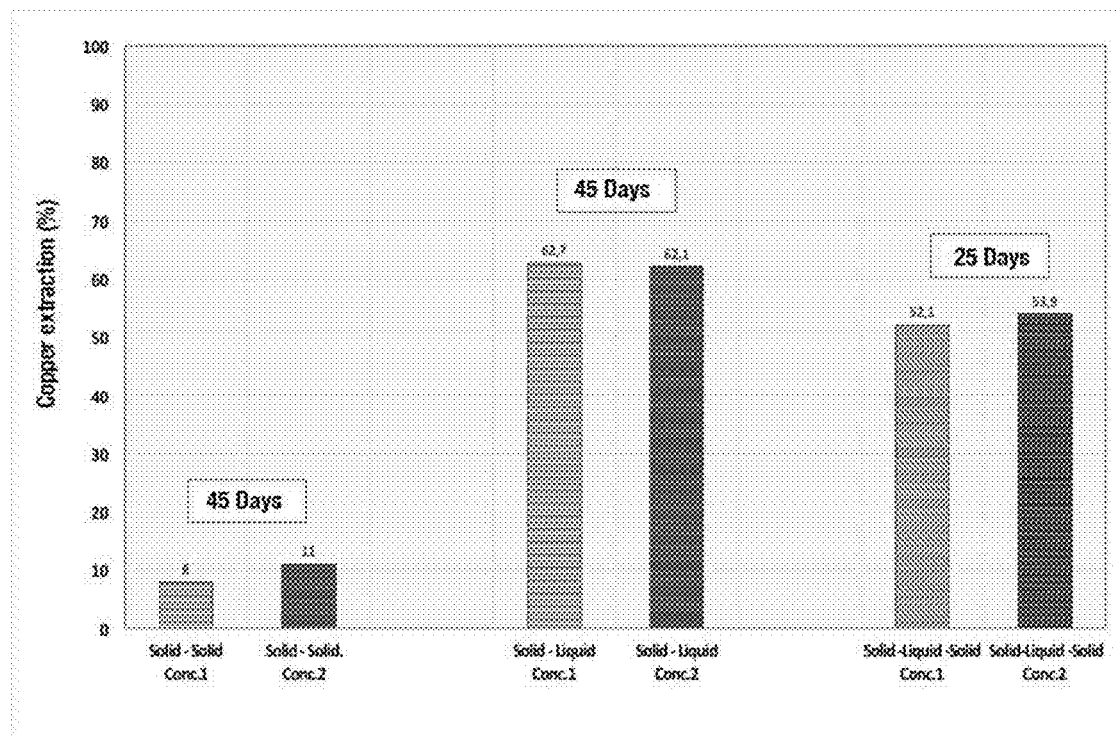
FIG. 15 shows a copper-extraction chart based on the type of reaction used for extracting copper from the concentrate, during steps I, II and III.

Once the time of the test was completed, the solution was filtered and the solid separated from the liquid, in order to carry out the corresponding chemical analyzes and determine in each test the extraction of copper, as shown in FIG. 15.

C. Solid-Liquid-Solid Reaction (Water and Acid)

To conduct the tests, 50 grams of each concentrate were weighed (Conc. 1 and Conc. 2), then each sample was subjected to the Moistening and Solvation step, which consisted on the addition in solid form of 20 g of NaCl on the concentrate, then a solution composed of water and acid was added, achieving a final moisture of 11%. Once the concentrates were wetted, the second step of the process was initialized, wherein the concentrates were stored in covered bottles for a period of 25 days at room temperature. After the Selective Transformation and Precipitation period, the third step of the process was initialized, wherein the concentrate was washed for 30 minutes with a solution at pH 1. The extraction results can be seen in FIG. 15, where it can be observed that under the solid-liquid-solid conditions, a high extraction for both concentrates is achieved in only 25 days with a low concentration of sodium chloride; however, the solid-liquid condition with a high concentration of NaCl achieved an extraction of over 60% in 45 days. On the contrary, the solid-solid condition had a low extraction.

Example 19: Extraction of Copper Depending on the Type of Salts and pH Under Solid-Liquid-Solid Condition The results of FIG. 16 were obtained using two primary copper concentrates, called Conc. 1 and Conc. 2, which had a particle size distribution 100% between 75-106 microns and a total copper percentage of 25.37% and 25.57%, respectively (see Table 3). Subsequently, the steps of the method under the solid-liquid-solid condition were performed to evaluate the effect of the type of salt and the pH, as described below.

A. Solid-Liquid-Solid Reaction NaCl (Water and Acid)

To conduct the tests, 50 grams of each concentrate were weighed (Conc. 1 and Conc. 2). Then, each sample was subjected to the Moistening and Solvation step, which consisted on the addition in solid form of 20 g of NaCl on the concentrate, a solution composed of water and acid was immediately added, achieving a final moisture of 12%. Once the concentrates were wetted, the second step of the process was initialized, where the concentrates were stored in closed bottles, for a period of 25 days at room temperature. After the Selective Transformation and Precipitation period, the third step of the process was initialized, wherein the concentrate was washed for 30 minutes with a solution at pH 1. The extraction results can be seen in FIG. 16.

B. Solid-Liquid-Solid Reaction NaCl (Water)

To conduct the tests, 50 grams of each concentrate were weighed (Conc. 1 and Conc. 2), then each sample was subjected to the Moistening and Solvation step, which consisted on the addition in solid form of 20 g of NaCl on the concentrate; then a solution composed only of water at pH 7.03 was added, achieving a final moisture of 12%. Once the concentrates were wetted, the second step of the process was initialized, wherein the concentrates were stored in closed bottles for a period of 25 days at room temperature. After the Selective Transformation and Precipitation period, the third step of the process was initialized, wherein the concentrate was washed for 30 minutes with a solution at pH 1. The extraction results can be seen in FIG. 16.

C. Solid-Liquid-Solid Reaction Ferric Sulfate (Water and Acid)

To conduct the tests, 50 grams of each concentrate were weighed (Conc. 1 and Conc. 2), then each sample was subjected to the Moistening and Solvation step, which consisted on the addition in solid form of 25 g of ferric sulfate on the concentrate; then a solution composed of water and acid was added, achieving a final moisture of 12%. Once the concentrates were wetted, the second step of the process was initialized, wherein the concentrates were stored in closed bottles for a period of 25 days at room temperature. After the Selective Transformation and Precipitation period finished, the third step of the process was initialized, wherein the concentrate was washed for 30 minutes with a solution at pH 1.

Figure 16:
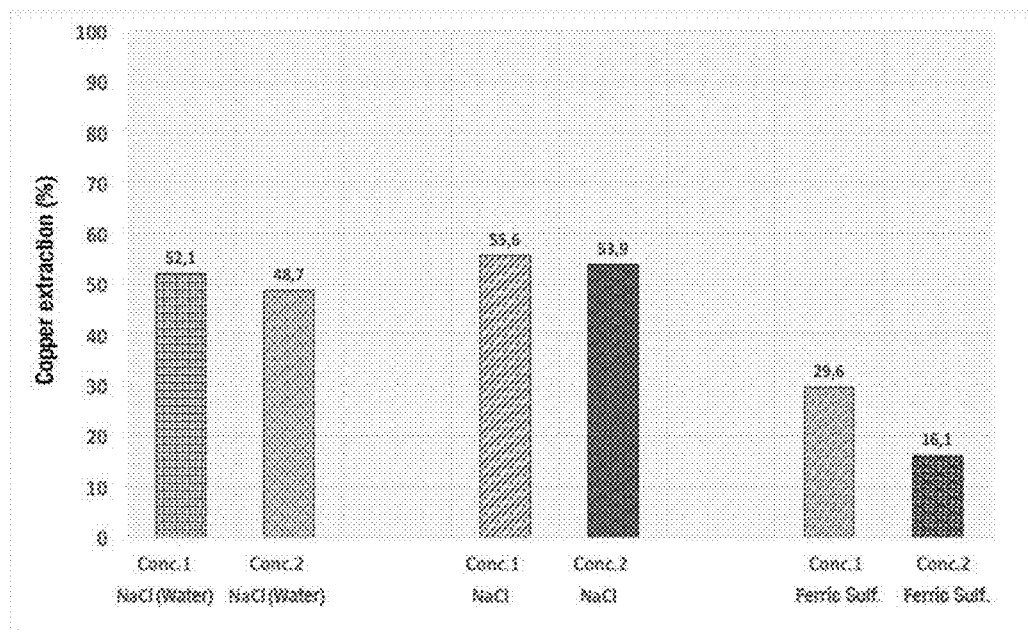
FIG. 16 shows a copper-extraction chart depending on the type of salt and pH under solid-liquid-solid condition.

The results of the extraction can be seen in FIG. 16, identifying that the extraction of copper from the concentrates under the solid-liquid-solid condition—both in the tests that were wetted with water only and add-water, achieved the highest extraction. On the contrary, tests with ferric sulfate show a low extraction, which coincides with the literature. On the other hand, this example demonstrates that the extraction can be carried out only with the presence of chloride and water, which confirms that under the solid-liquid-solid condition chalcopyritic concentrates can be solubilized, without the need to add sulfuric acid and without curing process, which differs from the teachings of the state of the art.

Example 20: Extraction of Copper as a Function of Time During Two Cycles of the Method, Using Two Primary Copper Concentrates The results of FIG. 17 were obtained from the continuation of tests A, B and C of Example 19. Once the first cycle of the method with the Acid-Chlorinated Washing was completed, the concentrate was recovered and dried in order to begin with a second cycle of the method. After the concentrate was dried, the Moistening and Solvation step was carried out under the following conditions.

Solid-Liquid-Solid NaCl (Water and Acid)
  Conc. 1 water and acid; Mass of 47 g of concentrate and 17 g/L of NaCl, moisture: 11%
  Conc. 2 water and acid; Mass of 48 g of concentrate and 18 g/L of NaCl, moisture: 12%.
Solid-Liquid-Solid NaCl (Water)
  Conc. 1 water; Mass of 46 g of concentrate and 16 g/L of NaCl, moisture: 11%.
  Conc. 2 water; Mass of 47 g of concentrate and 17 g/L of NaCl, moisture: 12%.
Solid-Liquid-Solid Ferric Sulfate (Water and Acid)
  Conc. 1 water and acid; Mass of 47 g concentrate and 23 g/L of ferric sulfate, moisture: 11%
  Conc. 2 water and acid; Mass of 48 g of concentrate and 24 g/L of ferric sulfate, moisture: 12%.

Once the concentrate was subjected to the first step, the Selective Transformation and Precipitation step was imposed for 25 days, at room temperature, for all tests. Once step two was completed, the Acid-Chlorinated Washing Step was performed for 30 minutes with an acidulated pH 1 solution for all tests.

Figure 17:
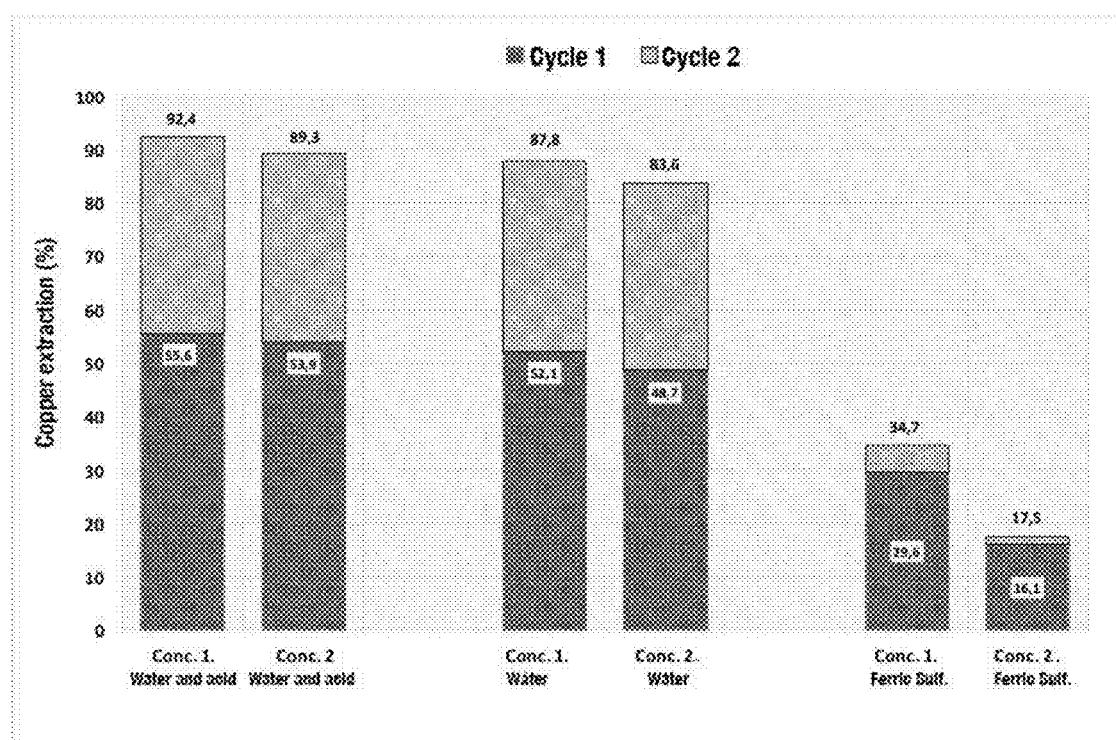
FIG. 17 shows a graph of copper extraction as a function of time during two cycles of the method, using two primary copper concentrates.

The results can be seen in FIG. 17 and it can be concluded that by means of the solid-liquid-solid condition the primary concentrates can be dissolved in 50 days, at room temperature, only in the presence of water or with the combination of water and acid. These results confirm that the addition of sulfuric acid is not necessary to achieve the maximum extraction of copper; therefore, the suggested invention is contrary to the methods suggested in the state of the art.

Example 21: Table of Parameters and Salt Concentrations (g/L) in Effluents of the First Acid-Chlorinated Washing of the Tests of Example 18 and 19

The results of Table 4 were obtained using the effluent from the washing solution of the tests of Examples 18 and 19. The measurement of total copper (CuT) was performed by atomic absorption spectroscopy. Solutions containing a copper concentration greater than 5 g/L were confirmed by volumetric technique. The measurement of Cu(I) was carried out using an iodometric technique. The determinations of arsenic (As), total Iron (FeT) and ferrous ion ($Fe^{+2}$) were made by atomic absorption spectroscopy. Ferric ion concentration was calculated by subtracting the total Iron to the ferrous concentration. On the other hand, chloride measurement was performed by volumetrics using the Morh method.

The results of the chemical analysis and parameters of all the solutions can be seen in Table 4, wherein we can note that the dissolution occurs in different ranges of redox potential Eh, both higher than 700 mV and lower than 700 mV, confirming that—under the above-mentioned conditions and by the suggested method, the copper extraction does not depend on the redox potential and can occur in the presence of high concentrations of chlorocuprate I complexes, contrary to the teaching suggested in the state of the art for chlorinated processes. In addition, it can be identified that by means of the solid-liquid-solid condition, the method is selective for copper, since there is no stoichiometric release of iron and the presence of arsenic in the washing solutions is not Identified; therefore, one can infer that though the use of the suggested method enargite or tennantite concentrate could be processed.

TABLE 4

| Kind of reaction | CuT g/l | $Cu^{1+}$ g/l | $Cu^{2+}$ g/l | FeT g/l | $Fe^{2+}$ g/l | $Fe^{3+}$ g/l | As mg/l | pH | Eh mV |
|---|---|---|---|---|---|---|---|---|---|
| Solid-Solid Conc. 1 | 5.53 | 1.18 | 4.35 | 10.5 | 9.9 | 0.6 | ND | 1.3 | 708.2 |
| Solid-Solid Conc. 2 | 5.50 | ND | 5.50 | 10.6 | 3.1 | 7.4 | ND | 0.8 | 663.4 |
| Solid-Liquid Conc.1 | 16.58 | 12.20 | 4.38 | 0.01 | ND | 0.01 | ND | 3.0 | 749.0 |
| Solid-Liquid Conc. 2 | 19.86 | 16.00 | 3.92 | 0.31 | 0.28 | 0.03 | ND | 2.2 | 783.0 |
| Solid-Liquid-Solid Conc. 1 | 22.7 | 19.55 | 3.23 | 0.22 | 0.17 | 0.05 | ND | 0.4 | 575.0 |

TABLE 4-continued

| Kind of reaction | CuT g/l | $Cu^{1+}$ g/l | $Cu^{2+}$ g/l | FeT g/l | $Fe^{2+}$ g/l | $Fe^{3+}$ g/l | As mg/l | pH | Eh mV |
|---|---|---|---|---|---|---|---|---|---|
| Solid-Liquid-Solid Conc. 2 | 23.75 | 20.30 | 3.45 | 0.66 | 0.57 | 0.09 | ND | 0.5 | 571.0 |
| Solid-Liquid-Solid Conc. 1 (water) | 32.50 | 28.57 | 3.95 | 0.07 | ND | 0.07 | ND | 1.5 | 614.0 |
| Solid-Liquid-Solid Conc. 2 (water) | 20.30 | 17.72 | 2.62 | 10.4 | 8.85 | 1.55 | ND | 1.4 | 595.7 |
| Solid-Liquid-Solid Conc. 1 Ferr. Sul. | 14.26 | ND | 14.26 | 26.94 | 26.82 | 0.12 | ND | 1.5 | 573.2 |
| Solid-Liquid-Solid Conc. 2 Ferr. Sul. | 7.21 | ND | 7.21 | 30.0 | 5.99 | 24.01 | 47.95 | 0.8 | 646.9 |

Example 22: Sequential Copper Analysis of Two Copper Concentrates, after being Subjected to the Selective Transformation and Precipitation Step The results of table 5 were obtained by weighing 50 grams of each concentrate (Conc. 1 and Conc. 2), then each sample was subjected to the Moistening and Solvation step, which consisted on the addition of 20 g of NaCl on the concentrate, then a solution composed of water at pH 1 was added, achieving a final moisture of 12%. Once the concentrates were wetted, step II of Selective Transformation and Precipitation was initialized, wherein the concentrates were stored in closed bottles for a period of 25 days, at room temperature. Once step II was concluded, a sample of both concentrates was taken to conduct the sequential copper analysis, in order to evaluate the generation of soluble species in sulfuric acid and sodium cyanide, which precipitated during step II. Subsequently, step III of Acid-chlorinated washing was carried out with a solution at pH 1, and stirring at 120 rpm for 15 minutes, in order to remove the soluble copper generated in step II. The results can be seen in Table 5, wherein it is verified that for both concentrates the precipitates are compounds soluble in sulfuric acid. In addition, it can be identified that the soluble copper is partially removed with the Acid-Chlorinated Washing Step.

TABLE 5

| Sample D | CuT (%) | CuSH+ (%) | CuNaCN (%) | Cu Gravel (%) |
|---|---|---|---|---|
| Conc. 1 (Head) | 25.37 | 1.33 | 4.78 | 19.40 |
| Conc. 1 (25 days, step II) | 10.14 | 8.80 | 0.13 | 1.08 |
| Conc. 1 (Chlorinated Washing) | 6.75 | 3.29 | 0.06 | 3.20 |
| Conc. 2 (Head) | 25.57 | 2.50 | 0.75 | 22.06 |
| Conc. 2 (25 days, step II) | 9.38 | 8.29 | 0.16 | 1.34 |
| Conc. 2 (Chlorinated Washing) | 4.69 | 3.34 | 0.26 | 1.27 |

Figure 18:
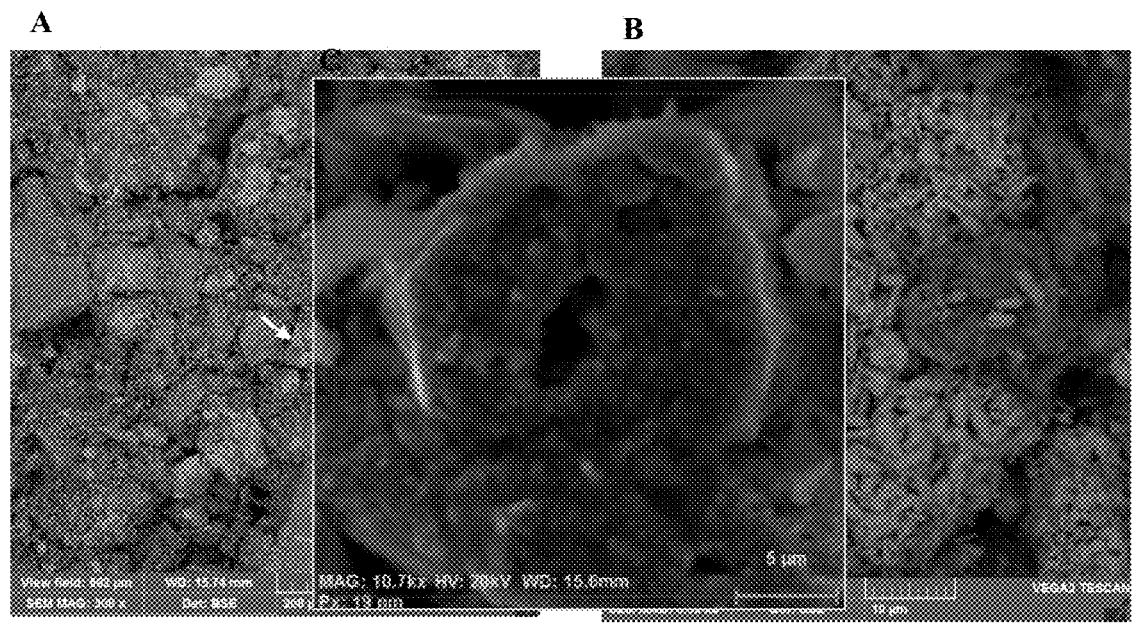
FIG. 18 shows images of Conc. 2 concentrate subjected to the Moistening-Solvation and Selective Transformation-Precipitation step for 25 days.

Example 23: Images of Conc. 2 Concentrate Subjected to the Moistening-Solvation and Selective Transformation-Precipitation Step for 25 Days The results of FIG. 18 were obtained from the test with concentrate Conc. 2 of Example 22, which was subjected to steps I and II. To do this, a sample of concentrate Conc. 2 was taken and used to conduct a microscopy analysis, using a scanning electron microscope TESCAN® Vega-3 model, with EDS Bruker-probe detector—Quantax model, series 400, in order to evaluate the precipitates and the physical effect of haloclasty on the concentrate generated in step II of Selective Transformation and Precipitation.

Image A: General image of the concentrate sample, wherein the precipitates generated during the second step of the method can be identified.

Image B: Specific area of the general image A (white arrow), wherein one can see in detail the shape of the soluble chlorinated copper precipitates, which have a shape defined by the loss of moisture during step II.

Image C: It shows a grain of concentrate that was fragmented due to the phenomenon of haloclasty in the Selective Transformation and Precipitation Step, demonstrating a physical effect of the method on the concentrate grain.

The previous section is considered only illustrative of the principles of the invention. The scope of the claims should not be limited by the exemplary embodiments detailed in the previous section, but they should be provided with the broadest interpretation congruent with the description as a whole.

The invention claimed is:

1. A method for the solubilization of metals from ores and/or concentrates of sulphide ores of primary and/or secondary origin comprising said metals, wherein said method comprises sequential and/or overlapped steps as follows:

I. Moistening and Solvation, which corresponds to a step in a non-oxidative environment, where the ore or concentrate is moisten by addition of water; sulfuric acid in an amount of up to 15 kg per ton of ore; sodium chloride in an amount that ranges from 60 to 80 kg per ton of ore, without adding oxidizing or reducing agents, wherein this step includes the contact of the ore or concentrate with recirculating solutions that contain chloride, iron and copper ions, in an unsaturated environment and a final moisture of at least 8%;

II. Selective Transformation and solid-liquid-solid Precipitation, which corresponds to a chemical and physical step that does not depend on the redox potential and it is carried out in a pH ranging between 0.5 and 7, wherein the ore or concentrate in the presence of water, or water and acid is transformed into soluble species of copper, which precipitate on the ore or concentrate, being this step carried out under a condition of chloride supersaturation, a condition that is achieved by periods of non-irrigation and evaporation, through non-irrigation periods for a time ranging from 5 to 90 days, at room temperature; favoring the phenomena of haloclasty and crystallization of salts; without air injection and without aeration by constant irrigation; where the final moisture content is 6 to 10%; and III. Acid-Chlorinated Washing, which corresponds to a non-oxidative washing step, where an acidulated solution is added with or without sodium chloride at a rate of 7 L/h/m$^2$, where the sodium chloride is at a concentration of 120 to 200 g/L and where the pH of the solution is between 0.5 to 6 in order to remove the soluble copper species precipitated in the second step of the process; furthermore, a concentration of chloride and moisture to the ore or concentrate bed is restored, wherein the three steps are carried out independently of the redox potential of the medium and repeated one or more times.

2. The method according to claim 1, wherein the chloride is added in the solution as a solid or in solution in step I, in the form of sodium chloride or chloride ion.

3. The method according to claim 1, wherein the steps I and the step II is conducted only with the addition or presence of water.

4. The method according to claim 1, wherein the final moisture of the ore in step II shall be between 8 and 11%.

5. The method according to claim 1, wherein the supersaturation condition of species and salts in step II is achieved through periods of no irrigation and evaporation.

6. The method according to claim 1, wherein the air injection and the aeration by constant irrigation in step II is not required, since in this step there is no irrigation for long periods of time; therefore, the supersaturation condition is improved.

7. The method according to claim 1, wherein the addition of water and acid in step I is carried out separately or together.

8. The method according to claim 1, wherein the ore is washed in step III by a continuous or intermittent irrigation with a solution containing acidulated water, or acid and chloride.

9. The method according to claim 1, wherein in step III of Acid-Chlorinated Washing through limited or prolonged irrigation the presence of Cu(I) or Cu(II) is promoted through limited or prolonged irrigation, respectively.

10. The method according to claim 1, wherein the metals to be solubilized are selected from the group including copper, zinc, nickel, molybdenum, cobalt, lead, among others.

11. The method according to claim 1, wherein the solubilization of copper is from sulphide ores with arsenical contents and/or concentrates of sulphide ore with arsenical contents containing said copper.

12. The method according to claim 1 wherein the ore to be solubilized is crushed by conventional crushing or HPGR.

13. The method according to claim 1, wherein step I of Moistening and Solvation, step II of Selective Transformation and Precipitation, and step III of Acid-Chlorinated Washing is applied to sulphide copper concentrates.

14. The method according to claim 1, wherein the chloride ions is incorporated into the process in the form of sodium chloride, potassium chloride, magnesium chloride, ferrous chloride, or through the use of recirculation solutions of the process that contain chloride, iron and copper ions.

15. The method according to claim 1 wherein the solubilization of copper occurs from sulphide copper secondary ores.

16. The method according to claim 1, wherein the extraction condition is solid-liquid-solid in step II.

17. The method according to claim 1, wherein step I of Moistening and Solvation is conducted at pH between 0.5 and 7.

18. The method according to claim 1, wherein step II of Selective Transformation and Precipitation is conducted by solid-liquid, and solid-liquid-solid condition.

19. The method according to claim 1, wherein the step III of Acid-Chlorinated Washing is conducted with a reused solution with the presence of chloride and iron ions.

20. The method according to claim 1, wherein the chloride salt come from seawater, brine from desalination plants, halite, Bischofite and commercial sodium chloride.

21. The method according to claim 1, wherein steps I, II and Ill is carried out at room temperature.

* * * * *